United States Patent
Bredbeck et al.

(10) Patent No.: US 10,704,542 B2
(45) Date of Patent: Jul. 7, 2020

(54) RECIPROCATING-PISTON MACHINE, COMPRESSED-AIR SUPPLY INSTALLATION, COMPRESSED-AIR SUPPLY SYSTEM, AND VEHICLE

(71) Applicant: WABCO GMBH, Hannover (DE)

(72) Inventors: Klaus Bredbeck, Landesbergen (DE); Dirk Kirchhoff, Gronau (DE); Eduard Nuss, Gronau (DE); Marco Seeger, Langenhagen (DE); Uwe Stabenow, Laatzen (DE); Fritz Woltmann, Lehrte (DE)

(73) Assignee: WABCO GMBH, Hannover (DE)

( * ) Notice: Subject to any disclaimer, the term of this patent is extended or adjusted under 35 U.S.C. 154(b) by 143 days.

(21) Appl. No.: 16/068,132

(22) PCT Filed: Jan. 19, 2017

(86) PCT No.: PCT/EP2017/000057
§ 371 (c)(1),
(2) Date: Jul. 5, 2018

(87) PCT Pub. No.: WO2017/137141
PCT Pub. Date: Aug. 17, 2017

(65) Prior Publication Data
US 2019/0010937 A1   Jan. 10, 2019

(30) Foreign Application Priority Data
Feb. 11, 2016   (DE) .................... 10 2016 001 576

(51) Int. Cl.
*F04B 39/00* (2006.01)
*F04B 25/00* (2006.01)
(Continued)

(52) U.S. Cl.
CPC .......... *F04B 39/0044* (2013.01); *B60G 11/27* (2013.01); *F04B 25/005* (2013.01);
(Continued)

(58) Field of Classification Search
CPC .... F04B 27/005; F04B 27/02; F04B 39/0022; F04B 39/0027; F04B 39/0044; F16J 1/14
See application file for complete search history.

(56) References Cited

U.S. PATENT DOCUMENTS

| | | | | |
|---|---|---|---|---|
| 4,729,291 A | * | 3/1988 | Miller | F04B 27/02 92/138 |
| 5,638,738 A | * | 6/1997 | Sell | F01B 1/08 74/44 |

(Continued)

FOREIGN PATENT DOCUMENTS

| | | |
|---|---|---|
| DE | 4420861 A1 | 12/1994 |
| DE | 102004020104 A1 | 11/2005 |

(Continued)

*Primary Examiner* — Thomas E Lazo
(74) *Attorney, Agent, or Firm* — Leydig, Voit & Mayer, Ltd.

(57) ABSTRACT

A reciprocating-piston machine includes at least one first cylinder and at least one first piston assigned to the first cylinder as well as at least one second cylinder and at least one second piston assigned to the second cylinder. During operation, the first piston and the second piston are deflected in a respective cylinder displacement chamber of the respective first cylinder and the second cylinder. The reciprocating-piston machine further includes a crankshaft which, during operation, can be driven and which has an eccentric crankshaft journal and a drive shaft coupling designed for the coupling of a drive shaft of a drive motor for driving the crankshaft. Additionally, the reciprocating-piston machine includes a first connecting rod configured to deflect the first piston, a second connecting rod configured to deflect the
(Continued)

second piston, and a bearing pin about which the first and second connecting rod are rotationally movable.

26 Claims, 10 Drawing Sheets

(51) Int. Cl.
    *F04B 39/16*     (2006.01)
    *B60G 11/27*     (2006.01)
    *F04B 35/01*     (2006.01)
    *F04B 27/00*     (2006.01)
    *B60G 17/056*     (2006.01)

(52) U.S. Cl.
    CPC ............ *F04B 27/005* (2013.01); *F04B 35/01* (2013.01); *F04B 39/0005* (2013.01); *F04B 39/0027* (2013.01); *F04B 39/0094* (2013.01); *F04B 39/16* (2013.01); *B60G 17/0565* (2013.01); *B60G 2500/02* (2013.01); *B60G 2500/30* (2013.01); *B60G 2600/66* (2013.01)

(56) References Cited

U.S. PATENT DOCUMENTS

| | | | |
|---|---|---|---|
| 5,733,108 A * | 3/1998 | Riffe | F04B 39/0011 417/542 |
| 7,584,738 B2 * | 9/2009 | Stott | F16F 15/173 123/197.1 |
| 2005/0238513 A1 * | 10/2005 | Mueller | F04B 27/02 417/437 |

FOREIGN PATENT DOCUMENTS

| | | |
|---|---|---|
| EP | 0148348 A1 | 7/1985 |
| WO | WO 2004029476 A1 | 4/2004 |
| WO | WO 2009083290 A1 | 7/2009 |

* cited by examiner

RECIPROCATING-PISTON MACHINE, COMPRESSED-AIR SUPPLY INSTALLATION, COMPRESSED-AIR SUPPLY SYSTEM, AND VEHICLE

CROSS REFERENCE TO RELATED APPLICATIONS

This application is a U.S. National Stage Application under 35 U.S.C. § 371 of International Application No. PCT/EP2017/000057 filed on Jan. 19, 2017, and claims benefit to German Patent Application No. DE 10 2016 001 576.4 filed on Feb. 11, 2016. The International Application was published in German on Aug. 17, 2017 as WO 2017/137141 A1 under PCT Article 21(2).

FIELD

The invention relates to a reciprocating-piston machine, in particular a two-stage or multi-stage piston compressor. The invention also relates to a compressed-air feed installation, to a compressed-air feed system, and to a vehicle, in particular a passenger motor vehicle, having a reciprocating-piston machine, in particular a piston compressor.

BACKGROUND

A compressed-air feed installation is used in vehicles of all types, in particular for feeding compressed air to an air spring installation of a passenger motor vehicle or of a utility vehicle. Air spring installations may also comprise ride-height control devices by means of which the distance between vehicle axle and vehicle body can be adjusted. An air spring installation of a pneumatic compressed-air feed system as mentioned in the introduction comprises a number of air bellows pneumatically connected to a common line (gallery), which air bellows can, with increasing filling, lift the vehicle body and, with decreasing filling, lower the vehicle body. Such a system is used for example in an off-road vehicle and in a sports utility vehicle (SUV) or in a utility or passenger transport vehicle.

To ensure long-term operation of the compressed-air feed installation, the latter has an air dryer by means of which the compressed air can be dried. The accumulation of moisture in the compressed-air feed system, which can otherwise, in the presence of relatively low temperatures, lead to valve-damaging ice crystal formation and other undesired effects in the compressed-air feed installation and in the pneumatic installation, is thus avoided. An air dryer has a drying agent, normally a granulate filling, which can be flowed through by the compressed air, such that the granulate filling—in the presence of relatively high pressure—can, by adsorption, take in moisture that is contained in the compressed air. Here, it has often proven to be expedient for the dry granulate to be accommodated in a dryer cartridge which has a dryer bed for conducting a compressed-air flow.

A compressed-air feed installation for use in a pneumatic compressed-air feed system having a pneumatic installation, for example having an air spring installation as described above, is operated with compressed air from a compressed-air supply, for example at a pressure level of 5 bar to 20 bar. The compressed air is provided to the compressed-air supply by means of an air compressor (compressor), in the present case having a reciprocating-piston machine, preferably having a two-stage or multi-stage piston compressor.

In the case of a compressed-air feed installation for a compressed-air feed system in a vehicle, the compressed-air supply which is fed by the air compressor is, on the one hand, pneumatically connected to a compressed-air connection for the feed of the pneumatic installation and, on the other hand, pneumatically connected to a ventilation connection. By means of a ventilation valve arrangement, the compressed-air feed installation and/or the pneumatic installation can be ventilated by discharging of air in the direction of the ventilation connection.

The reciprocating-piston machine in the air compressor (compressor) of the compressed-air supply is generally driven by means of a drive motor, the drive power of which is transmitted via a crankshaft and via one or more connecting rods to one or more pistons of the preferably two-stage or multi-stage piston compressor—a piston runs in a sealed manner in a cylinder during operation. The drive of the reciprocating-piston machine in the air compressor (compressor) of the compressed-air supply may also be realized for example by means of a belt drive.

In this way, ambient air that is drawn in, or intake air supplied from some other compressed-air source, is compressed. For this purpose, so-called twin piston compressors have basically proven expedient, that is to say two-stage piston compressors whose two pistons are driven by means of two connecting rods that are respectively assigned to said pistons, which connecting rods are in turn aligned exactly along a cylinder axis which is preferably aligned exactly parallel to and centrally symmetrical with respect to cylinder lining surfaces in the cylinder displacement chamber for the pistons.

Depending on the demanded dynamics and pressure loading, a two-stage or multi-stage compressor of said type or of some other type may, during operation, generate increasing operating noises which—as has been found—may be caused significantly by transmission of body-borne sound through the crank drive inter alia into the drive motor of the compressor or into the housing thereof. It is desirable to realize improved acoustics and a nevertheless reliable connecting-rod drive in a compressor in the form of the stated reciprocating-piston machine. This should in particular also be sufficient for a particularly low noise level in the passenger motor vehicle sector.

For example, DE 10 2004 020 104 discloses a twin compressor with symmetrically mounted double pistons for a compressor, having an elongate piston support which has a piston on each end, and having a connecting rod which runs approximately parallel to the piston support and which, by means of a bearing, is mounted rotatably on a pin of the piston carrier and which, at a distance therefrom, is mounted by means of a connecting-rod bearing on an eccentric of a drive device. The piston carrier comprises, in a central region extending between the two pistons, an intermediate space which is dimensioned for accommodating the connecting rod in freely movable fashion and in which the connecting rod is received in freely movable fashion.

SUMMARY

In an embodiment, the present invention provides a reciprocating-piston machine. The reciprocating-piston machine includes at least one first cylinder and at least one first piston assigned to the first cylinder as well as at least one second cylinder and at least one second piston assigned to the second cylinder. During operation, the first piston and the second piston are deflected in a respective cylinder displacement chamber of the respective first cylinder and the second cylinder. The reciprocating-piston machine further includes a crankshaft which, during operation, can be driven and which has an eccentric crankshaft journal and a drive shaft coupling designed for the coupling of a drive shaft of a drive motor for driving the crankshaft. Additionally, the reciprocating-piston machine includes a first connecting rod configured to deflect the first piston, a second connecting rod configured to deflect the second piston, and a bearing pin about which the first and second connecting rod are rotationally movable. The first connecting rod is mounted by at least one first connecting-rod bearing directly on the crankshaft journal and is movable by the eccentric crankshaft journal, and the second connecting rod is movable by the bearing pin. Between the bearing pin and at least one of the connecting rods, there is arranged at least one second connecting-rod bearing and at least one elastomer element that serves for the elastically dampened and/or resilient mounting of the at least one second connecting-rod bearing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
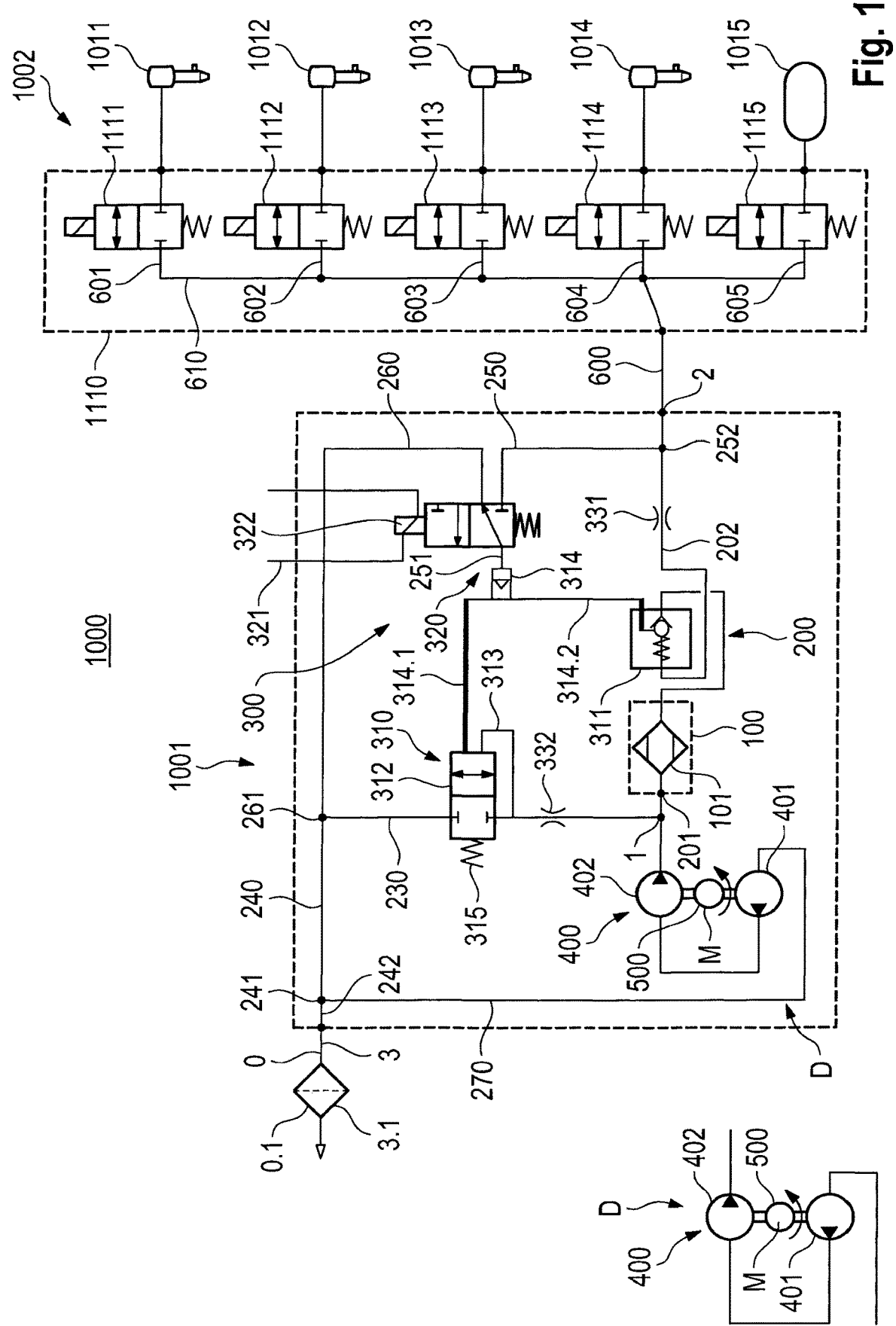
FIG. 1 shows a pneumatic circuit for an embodiment of a compressed-air feed installation with connected pneumatic installation in the form of an air spring installation for a vehicle, wherein a two-stage piston compressor shown in the detail D, in the context of an air compressor, feeds compressed air to the air spring installation via an air dryer arrangement and a valve arrangement in the form of an unblockable check valve, which is switchable by means of a controllable solenoid valve.

Solutions of the type employed in the prior art and described in the preceding background section run the risk of causing relatively high levels of noise generation and, potentially, transmission of body-borne sound through the crank drive into the compressor drive motor and thus also to the outside.

Embodiments of the present invention provide a reciprocating-piston machine, in particular a two-stage or multi-stage piston compressor, preferably twin compressor, and a compressed-air feed installation for operating a pneumatic installation with a compressed-air flow, by means of which improved acoustics and a nevertheless reliable crank drive in a piston compressor can be realized. This should in particular also be suitable for noise level requirements in the passenger motor vehicle sector. It is sought in particular, in the context of an acoustic improvement, to reduce body-borne sound emissions of a connecting-rod drive into adjoining, radiating components, such as electric motor, crank drive or similar components of an air compressor (compressor). In particular, it is the intention for the compressed-air feed installation to be relatively compact. Embodiments of the invention provide a corresponding compressed-air feed system and a vehicle having the compressed-air feed system, in particular for an air spring installation.

According to an embodiment of the invention, a reciprocating-piston machine is provided that includes (i) at least one first cylinder and at least one first piston assigned to the first cylinder and at least one second cylinder and at least one second piston assigned to the second cylinder, wherein, during operation, the pistons are deflected in a respective cylinder displacement chamber of the respective cylinder, (ii) a crankshaft which, during operation, can be driven and which has an eccentric crankshaft journal and a drive shaft coupling which is designed for the coupling of a drive shaft of a drive motor for driving the crankshaft, (iii) a first connecting rod designed for deflecting the first piston, (iv) a second connecting rod designed for deflecting the second piston, and (v) a bearing pin about which the first and second connecting rod are rotationally movable. The first connecting rod is mounted by at least one first connecting-rod bearing directly on the crankshaft journal and is movable the eccentric crankshaft journal, and the second connecting rod is movable by the bearing pin.

It is provided, according to embodiments of the invention that, between the bearing pin and at least one of the connecting rods, there is arranged at least one second connecting-rod bearing and at least one elastomer element which serves for the elastically dampened and/or resilient mounting of the at least one second connecting-rod bearing.

The second connecting-rod bearing may be arranged between the first connecting rod and the bearing pin or between the second connecting rod and the bearing pin. It is furthermore also possible for multiple second connecting-rod bearings to be arranged between connecting-rod journal and first and second connecting rod. The one or more second connecting-rod bearings are elastically dampened and/or resiliently mounted in each case by means of an elastomer element. Preferably, the second connecting-rod bearing and an elastically dampening and/or resilient elastomer element are arranged between the bearing pin and the first connecting rod, and the bearing pin is connected fixedly to the second connecting rod. A fixed connection is possible for example by means of a press fit.

The elastomer element may have both damping and resilient characteristics. The damping and resilient characteristics of the elastomer element are based on the material composition of the elastomer element and on the geometry thereof, in particular the shape thereof. The elastomer element may also have substantially only damping characteristics or only resilient characteristics. The elastomer element preferably has both damping and resilient characteristics.

A direct mounting is to be understood to mean that the connecting rod is moved directly by the crankshaft journal via the connecting-rod bearing.

According to an embodiment of the invention, a compressed-air feed installation for operating a pneumatic installation, in particular an air spring installation of a vehicle, preferably of a passenger motor vehicle, with a compressed-air flow, includes an air dryer arrangement in a pneumatic main line which pneumatically connects a compressed-air supply from an air compressor and a compressed-air connection to the pneumatic installation, a valve arrangement which is pneumatically connected to the pneumatic main line and which serves for controlling the compressed-air flow, and an air dryer in the pneumatic main line, wherein an air compressor with a reciprocating-piston machine, in particular a two-stage or multi-stage piston compressor, preferably twin compressor, is connected to the compressed-air supply.

According to embodiments of the invention, compressed-air feed systems and vehicles, in particular passenger motor vehicles, are also provided. Furthermore, according to embodiments of the invention, heavy goods vehicles are provided; in particular, a heavy goods vehicle compressor may be provided for air treatment.

A compressed-air feed system having a pneumatic installation and having a compressed-air feed installation serves for operating the pneumatic installation with a compressed-air flow, in particular an air spring installation of a vehicle, preferably of a passenger motor vehicle, wherein the pneumatic main line pneumatically connects a compressed-air supply from an air compressor with a reciprocating-piston machine, in particular a two-stage or multi-stage piston compressor, preferably twin compressor, and a compressed-air connection to the pneumatic installation.

A vehicle, in particular passenger motor vehicle, is equipped with a pneumatic installation, in particular an air spring installation, and with a compressed-air feed installation for operating the pneumatic installation with a compressed-air flow.

A cylinder axis is aligned substantially symmetrically with respect to cylinder lining surfaces for the pistons in the cylinder displacement chambers of the at least one cylinder. A cylinder axis with cylinder displacement chambers aligned therewith is to be understood in particular to mean that the cylinder lining surfaces at the cylinder displacement chambers of a cylinder for the piston are exactly parallel and symmetrical with respect to the cylinder axis.

The eccentric crankshaft journal, in particular also the drive shaft coupling, is preferably aligned parallel to a shaft axis aligned perpendicular to the cylinder axis; that is to say, the crankshaft journal and/or a connecting-rod bearing surrounding the latter is perpendicular to the cylinder axis.

Depending on the demanded dynamics and pressure loading in the case of an air compressor, a two-stage or multi-stage compressor, in particular a two-stage twin compressor or some other reciprocating-piston machine, during operation, increasingly generates operating noises which—as has been found—may be caused in particular by transmission of body-borne sound through the crank drive into the compressor drive motor. In the case of conventional plain bearings and needle bearings, a high level of noise generation occurs in particular upon the load alteration between the connecting rods. The operating noises are caused in part by connecting-rod bearing clearances that are required from a design aspect in the prior art. It is sought to compensate the connecting-rod bearing clearances of needle bearings, for example, by means of metallically hard stops, which however lead to high acoustic emissions. The stops of the connecting rod are, in the case of reciprocating-piston machines used in the prior art, transmitted directly into the surrounding components, and therefore lead to high operating noises. A plain bearing, composed in particular of plastic, can, owing to its relatively soft material characteristics, compensate the hard stops of the connecting-rod bearing clearance. However, plain bearings become worn over time, such that relatively long use of the plain bearings results in a relatively great increase in connecting-rod bearing clearance, which in turn leads to an increase in noise. In particular, plastics plain bearings exhibit good damping characteristics but are sensitive to wear at high temperatures and exhibit pronounced run-in characteristics, which leads to an increase in connecting-rod bearing clearance. Over the service life of the plastics plain bearing, this leads to an increase in acoustic emissions. By contrast, rolling bearings basically exhibit poor damping characteristics, because in this case, there is typically steel-on-steel contact.

According to embodiments of the invention, improved acoustics in a compressor can be realized by at least one elastomer element for the dampening and/or resilient mounting of the second connecting-rod bearing; even with low noise generation that is in particular acceptable for the passenger motor vehicle sector. Furthermore, the embodiments of the present invention are preferable for a utility vehicle or passenger transport vehicle, in particular if, in these, the compressed-air feed installation is designed for relatively high pressure amplitudes. Embodiments of the present invention may likewise be used in the heavy goods vehicle sector.

Prior art solutions—presented in a simplified manner—provide ball bearings or plain bearings for the bearing arrangement between connecting rods and the bearing pin. According to embodiments of the invention, dampening of the second connecting-rod bearing can lead to a reduction in noise of the reciprocating-piston machine and thus of the entire system, for example vehicle such as passenger motor vehicle, during operation. Embodiments of the invention provide for the dampening and/or resilient mounting of the second connecting-rod bearing, in particular rolling bearing or plain bearing, by means of elastomer elements. Elastomer elements have good damping characteristics and can absorb some of the noises. In this way, the noise generation can be advantageously significantly lowered. Embodiments of the invention can thereby combine the advantageous service life of rolling bearings, in particular of needle bearings, with the positive acoustic characteristics of plain bearings.

The damping characteristics of the elastomer element can reduce the excitation of body-borne sound. A transmission of energy between the connecting rod, the bearing pin and the second connecting-rod bearing can be reduced by means of the elastomer elements, in order to reduce the transmission of noise. The elastomer element may have the action of a decoupling element. Furthermore, the noises and body-borne sound emissions caused by the metallically hard stops for the clearance compensation can be reduced by means of the damping characteristics of the elastomer element. Furthermore, a loading of the edges of the bearings can be reduced, because tilting and misalignment of the connecting rods can be compensated by means of the elastomer element. This in turn reduces wear. The correction of oblique positioning and/or shaft bending is also possible by means of the elastomer element. The use of the elastomer element for the dampening and/or resilient mounting of the second connecting-rod bearing furthermore makes it possible for temperature-induced changes of the components, in particular of the connecting rod and of the bearing pin, to be compensated, whereby smaller bearing tolerances in particular in high-temperature and low-temperature applications are made possible. In particular, a material expansion in a radial direction in the event of temperature changes can be compensated. Furthermore, the bearing loading can be reduced in that the body-borne sound emissions of the excited axles, and the stiffness between the connecting rods or connecting-rod assemblies, can be reduced.

Embodiments of the invention permit, in particular an optimization of the acoustic characteristics, in particular of a two-stage twin compressor, because the elastomer element is freely parameterizable with regard to its design criteria. For example, the selection of the material, that is to say the hardness, and the geometry of the elastomer element, that is to say the diameter, the width, the wall thickness and/or similar parameters, is freely parameterizable. This can lead inter alia to a reduction in the noise generation, in particular of the initial level, of the level distribution and of the level increase of the service life. The free parameterizability makes it possible for the elastomer element to always be adapted to the prevailing operating conditions. Furthermore, in particular embodiments of the invention, the number of components can be reduced in which, for example, only an inner ring or outer ring of a rolling bearing is used. The omission of a bearing bushing or of an elastomer bushing in the case of a plain bearing makes it possible to reduce costs. The omission of additional components furthermore reduces the required structural space, for example because no separate bearing sleeve is necessary, whereby the use of larger or alternative bearing variants is made possible.

Furthermore, according to an embodiment of the invention having an elastomer element with a progressive damping characteristic curve, the impacting speed at the force reversal points can be optimized, such that the connecting rods do not strike the following components hard and thus cause a high level of body-borne sound transmission. It is thus possible for the acting force and the emitted body-borne sound to be reduced. It is furthermore possible to simplify the bearing arrangement and in this way reduce the excitation of body-borne sound. Furthermore, the service life of the compressor elements can be increased through reduction of the bracing action. Embodiments of the invention furthermore make it possible for the second connecting-rod bearing to be designed either as a needle bearing with an outer ring or as a plain bearing composed of metal. Furthermore, it is also possible for the required bearing tolerances to be reduced, which leads to a clearance reduction and ultimately also to a noise reduction.

In particular in a refinement in which the elastomer element is vulcanized directly onto the second connecting-rod bearing, it is possible for an additional component, normally a metal bushing, to be omitted.

In a further refinement, in which the second connecting-rod bearing is a plain bearing, the contact area can be enlarged, resulting in reduced surface loading. The dampening by means of the elastomer element leads to reduced transmission of body-borne sound, whereby the airborne sound is also quieter. The clearance compensation by means of the elastomer element can reduce the surface wear of the plain bearing and thereby lengthen the service life of the plain bearing. The use of a plain bearing can be less expensive and quieter than the use of a rolling bearing, because no rolling noises occur as a result of rolling bodies such as rolls, rollers, needles or the like.

The reciprocating-piston machine described here in the context of a compressed-air feed installation for use in a pneumatic compressed-air feed system, in particular the piston compressor, may however basically also be used in other fields of application, in particular where—as in the case of the stated compressed-air feed installations—it is sought to realize relatively high pressure amplitudes in a flexible and dynamic manner. In particular, the reciprocating-piston machine may be used in a compressor for a passenger motor vehicle chassis control arrangement. Furthermore, the reciprocating-piston machine, in particular the piston compressor, may be used in a multi-stage compressor with at least two compressor stages which operate in accordance with the drag piston principle. Embodiments of the invention may furthermore be used in a piston compressor for feeding air spring chassis and lifting axles, in particular in passenger motor vehicles. Embodiments of the invention may furthermore be used in a heavy goods vehicle piston compressor for the air treatment.

A connecting rod may be of rigid form without joint bearing, or else may be of jointed form, in particular with a joint bearing. A piston may be retained or held on the connecting rod or formed integrally on the connecting rod. The piston is preferably integrally formed on the connecting rod, fixedly connected to said connecting rod or held on said connecting rod by means of a piston holder.

In a particularly preferred refinement, the second connecting rod is mounted indirectly on the crankshaft journal by means of the second connecting-rod bearing and the bearing pin. An indirect mounting is to be understood to mean that the connecting rod is moved by the crankshaft journal via a further component (for example preferably the first connecting rod or the first connecting rod and the bearing pin), that is to say indirectly, but is not directly mounted on said crankshaft journal.

In a particularly preferred refinement, the first connecting rod may be movable directly by means of the eccentric crankshaft journal, and the second connecting rod may be movable indirectly by means of the eccentric crankshaft journal, in particular directly by means of the first connecting rod. Preferably, in this refinement, the second connecting rod (as follower connecting rod) is movable by the first connecting rod (as drive connecting rod), wherein the first connecting rod is moved directly by the crankshaft journal. An abovementioned refinement has proven to be expedient in particular for realizing a two-stage piston compressor, which can also be referred to as twin compressor, specifically with two oppositely situated pistons along a cylinder axis.

The at least one elastomer element is preferably a rubber element or introduced as an elastomer layer, in particular rubber coating, between the second connecting-rod bearing and connecting rod or bearing pin and second connecting-rod bearing. In particular, the rubber coating may be introduced to, for example vulcanized onto, injection-molded onto or similar, the pin surface and/or the connecting-rod inner surface. The elastomer element may be an applied elastomer layer, in particular an injection-molded or vulcanized-on elastomer layer. Preferably, the applied elastomer layer is applied to a bearing pin surface, to a connecting-rod inner surface of the first connecting rod and/or to a connecting-rod inner surface of the second connecting rod. The elastomer element, in particular in the form of an applied elastomer layer, serves for dampening and/or resilience.

In a preferred refinement, the elastomer element is an applied layer, in particular elastomer layer. The elastomer layer is preferably an injection-molded or vulcanized-on layer, which is preferably applied to a bearing pin surface, to a connecting-rod inner surface of the first connecting rod, to a connecting-rod inner surface of the second connecting rod, and/or to a connecting-rod bearing. The elastomer layer preferably serves, during operation, as a raceway for rollers of a connecting-rod bearing. In addition or alternatively, the elastomer layer may have both a dampening and a resilient action, or may have only a dampening action or only a resilient action. The applied layer may be applied to an inner surface or to an outer surface of the connecting-rod bearing.

In a further preferred refinement, the second connecting-rod bearing is a rolling bearing, and the elastomer element is an elastomer layer vulcanized onto the rolling bearing. The rolling bearing is preferably a needle bearing. Alternatively, instead of a needle bearing, use may also be made of some other rolling bearing, for example a ball bearing or a spherical bearing, preferably composed of metal. The needle bearing preferably has an outer ring and an inner ring. The elastomer layer may be vulcanized onto an outer surface of the outer ring or onto an inner surface of the inner ring. The elastomer layer is preferably vulcanized onto the outer surface of the outer ring. The needle bearing is preferably pressed between the bearing pin and at least one of the connecting rods. The inner surface of the inner ring of the needle bearing is preferably fixedly connected to the bearing pin by means of a press fit. A connecting rod inner surface of the at least one connecting rod is preferably connected to the elastomer layer vulcanized onto the outer surface of the needle bearing.

In a further refinement, the second connecting-rod bearing may be an outer ring of a rolling bearing, in particular an outer ring of a needle bearing, and the elastomer element may be an elastomer layer vulcanized onto the outer ring of the rolling bearing. The elastomer layer is preferably vulcanized onto an outer surface of the outer ring of the rolling bearing. The rolls of the outer ring of the rolling bearing run on a bearing pin surface of the bearing pin during operation. The elastomer layer vulcanized onto the outer surface of the rolling bearing is connected to a connecting-rod inner surface of the at least one connecting rod.

In a yet further refinement, the second connecting-rod bearing may also be a plain bearing, and the elastomer element may be an elastomer layer vulcanized onto the plain bearing. In this refinement, the plain bearing is preferably a metal plain bearing.

The elastomer element has a material-dependent hardness. Use is preferably made of a material, such as for example rubber for the elastomer element, which exhibits good damping characteristics in order to permit a noise reduction. It is furthermore alternatively or additionally possible to use a material which has good resilient characteristics. In particular, a rubber mixture may be used in order to adapt the characteristics of the rubber as material for the elastomer element. Furthermore, the characteristics of the elastomer element can be set by means of the geometry of the elastomer element. For example, a shape, in particular the width, height, length, diameter and wall thickness, may be adapted in accordance with the respective operating conditions. The adaptation of the material and the geometry of the elastomer element make it possible for the damping and resilient characteristics of the elastomer element to be optimized and adapted to respective operating conditions.

In a particularly preferred refinement, at least one of the connecting-rod bearings has a plain bearing or a rolling bearing. In particular, the connecting-rod bearing may have a needle bearing, a ball bearing or a spherical bearing. The first and second connecting-rod bearings may have plain bearings. The first and second connecting-rod bearings may also have rolling bearings. It is possible for the first connecting-rod bearing to have a plain bearing, and for the second connecting-rod bearing to have a rolling bearing. It is also possible for the first connecting-rod bearing to have a rolling bearing and for the second connecting-rod bearing to have a plain bearing. The first connecting-rod bearing is preferably a rolling bearing. In one refinement, the second connecting-rod bearing is a plain bearing. The plain bearing may for example be a plain bearing bushing or the like. The plain bearing may be surrounded by the elastomer element in order to be dampened during operation.

In a further particular preferred refinement, at least one of the connecting-rod bearings has an outer ring and/or an inner ring of a rolling bearing. The rolling bearing is preferably a needle bearing. The connecting-rod bearing may thus have only an outer ring, only an inner ring, or both an outer ring and an inner ring. The outer ring and inner ring of the rolling bearing may for example be a needle sleeve, a needle bushing, a metal ring or the like. The outer ring preferably has rolls or needles, rollers or the like on the inner surface thereof, and the inner ring preferably has rolls or needles, rollers or the like on the outer surface thereof. Both the outer ring and the inner ring may also have rings without rolls. The outer ring and inner ring of the rolling bearing may for example also be rings of needles, wherein, in this case, both the outer ring and the inner ring have rolls or needles, rollers or the like, which are designed to run on a surface during operation. The rolls or needles, rollers or the like of the rings of needles extend through both the outer surface and the inner surface of the outer ring and inner ring, such that the rolls or needles, rollers or the like run, during operation, on an oppositely situated inner surface and outer surface. If the connecting-rod bearing has an outer ring and inner ring, the outer ring and the inner ring of the rolling bearing are preferably arranged concentrically with respect to one another such that, during operation, rolls, for example needles of the outer ring run on an outer surface of the inner ring and rolls, for example needles of the inner ring run on an inner surface of the outer ring. It is also possible for one of the rings, that is to say outer ring or inner ring, to be designed as a ring without rolls, such that said ring serves substantially as a raceway for the rolls of the other ring. The ring, if it is designed without rolls, is preferably composed of a metal, in particular steel.

In a preferred refinement of the reciprocating-piston machine, the second connecting-rod bearing has an inner ring of a needle bearing, which inner ring is arranged around the bearing pin. The elastomer element is arranged between the inner ring of the needle bearing and at least one of the connecting rods. In particular, the elastomer element is vulcanized onto a connecting-rod inner surface, such that rolling bodies, rolls or needles, rollers or the like of the inner ring of the needle bearing run on the elastomer element during operation.

In a further preferred refinement of the reciprocating-piston machine, the second connecting-rod bearing has an outer ring of a needle bearing, which outer ring is arranged around the bearing pin. The elastomer element is arranged between the outer ring of the needle bearing and at least one of the connecting rods. In particular, the elastomer element is vulcanized onto a connecting-rod inner surface and serves for dampening the needle bearing. The rolling bodies, rolls or needles, rollers or the like of the outer ring of the needle bearing run on a bearing pin surface of the bearing pin during operation.

In one refinement, the elastomer element may be a separate part. The elastomer element may alternatively or additionally serve for generating a dampening action. Furthermore, the elastomer element may also serve for generating a resilient action. The elastomer element may have a dampening and a resilient action. It is also possible for elastomer elements with a dampening action to be combined with elastomer elements with a resilient action. The elastomer element may for example be an elastomer sleeve, an elastomer bushing, for example a plastics bushing, an elastomer cage, an elastomer ring or the like. The elastomer element is preferably placed, compressed or clamped between the bearing pin and second connecting-rod bearing or between the second connecting-rod bearing and at least one of the connecting rods. The elastomer element may extend over the entire length of a longitudinal axis of the bearing pin or over the length of the connecting-rod inner surfaces of the first and second connecting rods. It is alternatively also possible for multiple elastomer elements to be arranged between the bearing pin and second connecting-rod bearing or between the second connecting-rod bearing and at least one of the connecting rods. It is thus also possible, for example, for two elastomer elements to be arranged between the second connecting-rod bearing and the first connecting rod and/or for two elastomer elements to be arranged between the second connecting-rod bearing and the second connecting rod. It is however also possible for only one elastomer element to be arranged between the first connecting rod and the second connecting-rod bearing and/or for only one elastomer element to be arranged between the second connecting rod and the second connecting-rod bearing. It is alternatively also possible for only one elastomer element to be arranged between the first connecting rod or second connecting rod and the second connecting-rod bearing and for the respective other connecting rod to be connected directly and fixedly to the bearing pin, for example by means of metal press-fit elements and a metal press-fit connection. The elastomer element preferably has a dampening and/or resilient action.

In a preferred refinement, two elastomer elements are designed as elastomer bushings, in particular as plastics bushings, which are arranged between the bearing pin and second connecting-rod bearing. It is alternatively possible for only one elastomer element to be arranged between the bearing pin and second connecting-rod bearing. The second connecting-rod bearing is preferably a rolling bearing and in particular a needle bearing. The needle bearing may have an outer and an inner ring or only an outer ring, such that the plastics bushing in this case serves as an inner ring on which rolls of the outer ring of the needle bearing run during operation. The variant with outer ring and inner ring is preferred because the rolls, which run on the plastics bushing, of the outer ring can lead to increased wear. The plastics bushings may have a collar such that the second connecting-rod bearing is laterally enclosed by the plastics bushings. The collar serves for dampening the running noises of the rolls of the needle bearing or enclosing the sound emissions of the rolls. Furthermore, the collar makes it possible to prevent or at least reduce contact of the connecting rods with one another, such that wear of the connecting-rod material, in particular aluminum seizing, can be prevented or at least reduced. Furthermore, the collar makes it possible for the material expansion in an axial direction in the event of temperature changes to be compensated. The bearing pin, for example a steel coupling pin, is preferably fixed in the second connecting rod at the outside by means of a press fit. The second plastics bushings are preferably pressed onto the bearing pin. If an inner ring of the needle bearing is provided, said inner ring is preferably pressed onto the plastics bushings. The outer ring of the needle bearing is pressed into the second connecting rod. Instead of the plastics bushing or plastics bushings, use may also be made of an elastomer element.

In a preferred refinement, the elastomer element is of ring-shaped, bushing-shaped or sleeve-shaped form. The shape of the elastomer element may also be adapted to the shapes of the components which adjoin the elastomer element and/or which are dampened and/or resiliently mounted by the elastomer element. The elastomer element may also be of hollow cylindrical form. The wall thickness of the elastomer element is preferably constant. In one refinement, the wall thickness changes along a longitudinal axis of the elastomer element; in particular, the wall thickness increases or decreases. The wall thickness and the change in the wall thickness are preferably adapted to the operating conditions and in particular to the second connecting-rod bearing, and to the further components that are in contact with the elastomer element, such as for example the connecting rod and the bearing pin.

In a further preferred refinement, the elastomer element is an elastomer sleeve which is arranged around the second connecting-rod bearing and which serves for dampening rotational movements of the bearing pin. The elastomer element may also be or have an elastomer ring or an elastomer sleeve. The elastomer ring or the elastomer sleeve is, in this refinement, preferably clamped or pressed between at least one of the connecting rods and the second connecting-rod bearing, in particular a needle bearing.

In a further refinement, the elastomer element is plate-shaped, in particular a stud or ring-segment-shaped. The elastomer element may have one, two or more ring segments, for example elastomer ring segments, in particular rubber ring segments. The ring segments are preferably arranged opposite one another and in particular around the bearing pin. The parameters of the ring segments may also be adapted in accordance with the operating conditions; in particular, the geometry thereof and the material used may be selected in accordance with the operating conditions. The use of ring segments permits a reduction in material consumption and leads to smaller elastomer elements. In this way, a transmission of load is necessary for example only into two ring segments.

In a preferred refinement, the elastomer element is connected to or in contact with a metal support. The metal support may for example be a metal bushing, a metal sleeve, a metal ring or a metal plate. The elastomer element may for example be clamped into, adhesively bonded onto, vulcanized onto, or injection-molded into the metal support. In this case, the metal support preferably encloses the elastomer element. The elastomer element may also for example be clamped, adhesively bonded, vulcanized or injection-molded around the metal support. In this case, the elastomer element preferably encloses the metal support. It is also possible for an elastomer element to be arranged between two metal supports, for example in a sandwich-like manner. It is also possible for a metal support to be arranged between two elastomer elements, for example in a sandwich-like manner. In this case, the elastomer elements may be injection-molded onto the metal support and injection-molded into said metal support, or else may be separate parts, for example elastomer rings, which can be placed into and/or placed around said metal support. The elastomer element which is connected to or in contact with a metal support serves for dampening the second connecting-rod bearing. The second connecting-rod bearing may be a plain bearing or a rolling bearing, in particular a needle bearing.

In a further refinement, the elastomer element has at least two elastomer rings. The elastomer rings are preferably arranged parallel and with a spacing to one another between the bearing pin and at least one of the connecting rods. The elastomer rings may both be arranged between the bearing pin and second connecting-rod bearing or between the second connecting-rod bearing and at least one of the connecting rods. The elastomer rings may also both be arranged between the second connecting-rod bearing and at least one of the connecting rods. It is also possible, for example, for three elastomer rings to be arranged. The elastomer rings serve for elastically dampening the at least one second connecting-rod bearing. The elastomer rings may also have a resilient action or may have a damping and resilient action. It is also possible for elastomer plates or segmented elastomer rings to be arranged between the connecting rods and the bearing pin.

In a further refinement, the elastomer element has at least one plate arranged only at one side, in particular at a bearing pin top side. Alternatively or in addition, the elastomer element may have at least two mutually oppositely situated plates arranged at the bearing pin top side and at a bearing pin bottom side.

In a preferred refinement, the at least one elastomer element is arranged between an inner and an outer metal support. It is preferable for the inner metal support to be connected to the second connecting-rod bearing and for the outer metal support to be connected to at least one of the connecting rods. It is alternatively also possible for the inner metal support to be connected to the bearing pin and for the outer metal support to be connected to the second connecting-rod bearing. The connection between elastomer element and metal supports is preferably firm and direct. The connection may for example be such that an elastomer element for example in the form of an elastomer ring is clamped between the inner and the outer metal support. It is particularly preferable for the elastomer element to be fixedly and directly connected to the inner and to the outer metal support, for example by virtue of the elastomer element being introduced as a coating or a layer to an outer surface of the inner metal support and to an inner surface of the outer metal support, for example by being injection-molded in, vulcanized on or introduced using one or more other methods. Furthermore, the inner metal support may be fixedly and directly connected to the second connecting-rod bearing and the outer metal support may be fixedly and directly connected to at least one of the connecting rods, for example by virtue of the metal supports being clamped under stress. It is also possible for multiple metal supports to be arranged one inside the other, or for example for a metal support to be arranged between two elastomer elements. An arrangement of multiple alternating layers of metal supports and elastomer elements is also possible. In particular, the elastomer elements may have different material characteristics in order to thereby adapt the dampening and/or resilient mounting of the second connecting-rod bearing to the operating conditions.

In a further preferred refinement, the at least one elastomer element is arranged between an inner metal support and at least one of the connecting rods. The inner metal support is preferably connected to the second connecting-rod bearing, and the elastomer element is preferably connected to at least one of the connecting rods. It is alternatively also possible for the inner metal support to be connected to the bearing pin and for the elastomer element to be connected to the second connecting-rod bearing. The connection to the elastomer element is preferably direct and firm. The connection may for example be such that the elastomer element, for example in the form of an elastomer ring, is clamped between the inner metal support and at least one of the connecting rods. It is particular preferable for the elastomer element to be firmly and directly connected to the inner metal support and to at least one of the connecting rods, for example by virtue of the elastomer element being introduced as a coating or layer to an outer surface of the inner metal support and to a connecting-rod surface of at least one of the connecting rods, for example by being injection-molded in, vulcanized on or introduced using one or more other methods. In this preferred refinement, the elastomer element may also be firmly and directly connected to at least one of the connecting rods by virtue of the elastomer element being introduced directly between the inner metal support, for example a metal sleeve, and connecting rod, for example by being injection-molded in, injection-molded on, vulcanized on or similar. The second connecting-rod bearing may have an outer ring and an inner ring. Alternatively, the second connecting-rod bearing may also have only an outer ring or only an inner ring. The second connecting-rod bearing preferably has only an inner ring. The second connecting-rod bearing is preferably designed as a rolling bearing. In this case, rolls of the inner ring of the second connecting-rod bearing run on a metal support inner surface of the inner metal support. The inner ring of the second connecting-rod bearing is preferably firmly connected to the bearing pin, and particularly preferably firmly pressed together with the bearing pin.

Furthermore, in a further preferred refinement, the at least one elastomer element is arranged between the second connecting-rod bearing and an outer metal support. Alternatively, the elastomer element may also be arranged between the bearing pin and an outer metal support, wherein the outer metal support in this case is connected to the elastomer element. The elastomer element is preferably connected to the second connecting-rod bearing, and the outer metal support is preferably connected to at least one of the connecting rods. The connection may for example be such that the elastomer element, for example in the form of an elastomer ring, is clamped between the second connecting-rod bearing and the outer metal support. The elastomer element is particularly preferably firmly and directly connected to the second connecting-rod bearing and to the outer metal support, for example by virtue of the elastomer element being introduced as a coating or a layer to a connecting-rod bearing surface of the second connecting-rod bearing and to an inner surface of the outer metal support, for example by being injection-molded in, vulcanized on or introduced using one or more other methods.

In a further preferred refinement, the second connecting-rod bearing is a plain bearing bushing and the outer metal support is a metal sleeve, composed in particular of brass. In this refinement, the plain bearing bushing is arranged between the bearing pin and elastomer element and serves for the mounting of the one or more connecting rods around the bearing pin.

In a further refinement, the elastomer element is designed as a rubber element and is injection-molded between two steel sleeves. Said component is preferably pressed into a connecting rod or pressed onto the bearing pin and connected to the second connecting-rod bearing. A further refinement provides for the elastomer element to be designed as a rubber element and injection-molded onto a steel bushing. Said component is preferably pressed and/or adhesively bonded into a connecting rod. In a yet further refinement, the elastomer element may be designed as a rubber element and injection-molded onto a steel bushing or injection-molded into a connecting rod and connected to the second connecting-rod bearing. The elastomer element may, as a rubber element, also be installed as a solid rubber part, for example by being pressed in and/or adhesively bonded. In a further refinement, the elastomer element may be designed as a rubber element which is arranged in at least two parts on the circumference of the connecting rod.

In a further preferred refinement, the at least one elastomer element has at least two mutually separate ring segments. Of the at least two separate ring segments, it is preferable for at least one first ring segment to be arranged on a bearing pin top side between bearing pin and connecting rod and for at least one second ring segment to be arranged on a bearing pin bottom side between bearing pin and connecting rod. The second connecting-rod bearing is connected to the elastomer element, is dampened and/or resiliently mounted by the elastomer element, and is arranged between the bearing pin and elastomer element or between the elastomer element and connecting rod. The mutually separate ring segments of the elastomer element may for example enclose at most one quarter of the circumference on the bearing pin top side and at most one quarter of the circumference on the bearing pin bottom side, such that at least half of the circumference of the bearing pin is free from the elastomer element.

In a preferred refinement, a maximum deflection angle of the deflection of the connecting rods between respective longitudinal axes of the connecting rods amounts to at most 14°, for example at most 10° and preferably approximately 7°. The maximum deflection angle of the connecting rods may for example amount to at most +/−7°. The maximum deflection angle may be limited by various components of the reciprocating-piston machine. In particular, it is for example possible for the elastomer element to have elastomer protuberances which serve as stops and which limit the maximum deflection angle. It is alternatively or additionally also possible for the connecting rods to be designed, and arranged relative to one another, such that the maximum deflection of the connecting rods relative to one another is structurally limited. This is possible for example by virtue of one of the connecting rods being arranged at least partially within the other connecting rod.

In a preferred refinement, the elastomer element has a collar which is designed to prevent a displacement of the connecting rods relative to one another along a longitudinal axis of the bearing pin. The collar preferably furthermore serves for preventing or at least reducing tilting of the connecting rods relative to one another along a deflection axis other than a predetermined deflection axis. The collar of the elastomer element makes it possible for the number of components to be reduced, in that it is possible to omit stop disks on the bearing pin. Furthermore, an abutment of the connecting rods against one another along the longitudinal axis of the bearing pin is prevented. Furthermore, the elastomer element, in particular in combination with the collar, serves for sealing off the connecting-rod bearing, such that lubricant of the connecting-rod bearing, preferably a lubricating grease, lubricating oil or the like, cannot escape from the connecting-rod bearing.

In a further preferred refinement, the at least one elastomer element has elastomer protuberances which are arranged along the elastomer element and which serve as stops for rolls of the second connecting-rod bearing. The second connecting-rod bearing preferably has at least one rolling bearing, for example a needle bearing, a spherical bearing, a ball bearing or the like. The elastomer protuberances are preferably arranged along a circumference on an elastomer element, for example an elastomer ring. The elastomer protuberances may be arranged on an outer surface and/or on an inner surface of the elastomer element. If the elastomer protuberances are arranged on an outer surface of the elastomer element, it is preferable for an outer ring of a rolling bearing, in particular needle bearing, to be arranged around the elastomer element, such that, during operation, the rolls of the rolling bearing run on the outer surface of the elastomer element and the elastomer protuberances serve as stops for the rolls and limit the deflection. If the elastomer protuberances are arranged on an inner surface of the elastomer element, then it is preferable for an inner ring of a rolling bearing, in particular needle bearing, to be arranged so as to be enclosed by the elastomer element, such that, during operation, the rolls of the rolling bearing run on the inner surface of the elastomer element and the elastomer protuberances serve as stops for the rolls and limit the deflection. If the elastomer element has elastomer protuberances on its inner surface and outer surface, the elastomer element is preferably arranged between an outer ring and an inner ring of the rolling bearing.

In a further refinement, the at least one elastomer element has elastomer protuberances arranged along the elastomer element, which elastomer protuberances are designed to exert a dampening action on a surface of the second connecting-rod bearing. The elastomer protuberances may also be designed to exert a resilient action on a surface of the second connecting-rod bearing. The second connecting-rod bearing preferably has at least one plain bearing. The elastomer protuberances are particularly preferably arranged along a circumference on an elastomer element, for example an elastomer ring. The elastomer element may have an elastomer ring, multiple elastomer rings, an elastomer ring segment or multiple elastomer ring segments. The elastomer protuberances may be arranged on an outer surface and/or an inner surface of the elastomer element. Chambers are formed between the elastomer protuberances if a plain bearing is arranged around the elastomer element and/or the elastomer element is enclosed by the plain bearing. A lubricant, for example a lubricating grease, a lubricating oil or some other lubricant, or a friction reducing material, in particular a friction-reducing fluid, may be arranged in the chambers. Depending on the number of elastomer protuberances and on the spacing thereof, a certain number of chambers are formed between these and the plain bearing or plain bearings. The elastomer element is preferably designed so as to generate a progressive resilience characteristic curve.

In a further refinement, it has proven to be advantageous for the first connecting rod to be mounted by means of the first connecting-rod bearing directly on the crankshaft journal and for the first piston to be held on the first connecting rod by means of a piston holder. The second piston is integrally formed on the second connecting rod, and the second connecting rod is connected by means of the second connecting-rod bearing and the bearing pin to the first connecting rod. In this case of the refinement, a follower connecting rod with an integrally formed piston, and a drive connecting rod with a piston held thereon, are realized. It is basically possible, independently of this refinement, for a piston integrally formed in the connecting rod or a piston held in the connecting rod to be realized in accordance with requirements. For a follower connecting rod formed with the (low-pressure) compressor stage of a twin compressor, in particular, an integrally formed piston has proven to be expedient. For a (high-pressure) compressor stage, discussed further below, of a twin compressor, in particular, a drive connecting rod with a piston held thereon has proven to be expedient.

In a preferred design implementation, the first connecting-rod bearing may be realized as a ring ball bearing, which is preferably in the form of a ring ball bearing on the crankshaft journal, that is to say is formed directly on the crankshaft journal. The first connecting-rod bearing may also be a ring ball bearing and/or a joint bearing.

As already mentioned further above, a reciprocating-piston machine as a piston compressor with a two-stage compressor with a first and a second compressor stage has proven to be particularly expedient for the provision of compressed air for a compressed-air feed installation. In particular, the two-stage compressor may be in the form of a twin compressor. It is provided in particular that the first connecting rod of the second, in particular (high-pressure) compressor stage is formed, and the first connecting rod is mounted by means of the first connecting-rod bearing directly on the crankshaft journal. In addition or alternatively, it has proven to be advantageous for the second connecting rod of the first, in particular (low-pressure) compressor stage to be formed, and for the second connecting rod to be mounted by means of the second connecting-rod bearing and the bearing pin directly on the first connecting rod.

In one refinement of the reciprocating-piston machine, a second connecting-rod bearing, and at least one elastomer element which serves for the elastic dampening and/or resilient mounting of the second connecting-rod bearing, are arranged between the bearing pin and at least one of the connecting rods.

Embodiments of the invention relate to the use of the reciprocating-piston machine, in particular of the piston compressor, in a compressor or air compressor for a passenger motor vehicle chassis control arrangement. Embodiments of the invention relate to the use of the reciprocating-piston machine, in particular of the piston compressor, for the air treatment for a heavy goods vehicle. Furthermore, embodiment of the invention relates to the use of the reciprocating-piston machine in further compressors, such as for example an air-conditioning compressor, in vehicles such as passenger motor vehicles and utility vehicles, in electrohydraulic servo steering systems, and furthermore in a compressor for ABS/EBS hydraulic pumps. One embodiment of the invention also relates to use in electric drives for vacuum pumps. Embodiments of invention may also be used generally in piston connections.

All of the above-described embodiments of the reciprocating-piston machine may also be implemented without an elastomer element. In particular, it is for example possible for the second connecting-rod bearing to be designed as a needle bearing without a cage, that is to say in the form of two rings of needles situated one inside the other. These are then arranged between the bearing pin and the first and/or second connecting rod. The rolls or needles of the rings of needles then run on the respective other ring of needles and either on the bearing pin or on a connecting-rod inner surface. An embodiment of the needle bearing without a cage can thus increase the contact area.

FIG. 1 shows, in the detail D, an air compressor having a reciprocating-piston machine in the form of a two-stage piston compressor 400 with a first compressor stage 401 and a second compressor stage 402, which is driven by means of a motor 500 as drive motor M. A piston compressor 400 of said type is preferably used for pneumatic compressed-air feed systems 1000, such as is shown in FIG. 1.

FIG. 1 shows a pneumatic circuit diagram of a pneumatic compressed-air feed system 1000 with a compressed-air feed installation 1001 with an air dryer arrangement 100 and with a pneumatic installation 1002 in the form of an air spring installation. The compressed-air feed installation 1001 serves for operating the pneumatic installation 1002. The compressed-air feed installation 1001 has, for this purpose, an abovementioned compressed-air supply 1 and a compressed-air connection 2 to the pneumatic installation 1002.

In the present case, the compressed-air supply 1 is formed with an air supply 0, with an air filter 0.1 positioned upstream of the air supply 0, and with an air compressor which is positioned downstream of the air supply 0 via the air supply line 270 and which is driven by means of the motor 500. Here, the air compressor is, in the example of a reciprocating-piston machine, formed in the manner of a double air compressor, specifically a two-stage piston compressor 400 with a first compressor stage 401 and with a second compressor stage 402 and with a connection (not designated in any more detail) of the compressed-air supply 1.

The connection of the compressed-air supply 1 connects, in the pneumatic main line 200, at the first part 201 of the pneumatic main line, to the connection of the drying container 101 of the air dryer arrangement 100. The air dryer of the air dryer arrangement 100 is furthermore pneumatically connected by means of the second part 202 of the pneumatic main line, for the guidance of a compressed-air flow DL, to the pneumatic installation 1002.

In the main view shown in FIG. 1, it is provided that a branch line 230 branches off from the pneumatic main line 200 at the compressed-air supply 1 and connects to a ventilation line 240 for the ventilation to a ventilation filter 3.1 positioned downstream of the ventilation connection 3; the ventilation arrangement is connected by means of a further branch connection 241 and a connection section 242 to the ventilation line 240, and also via the branch connection 261 to a further ventilation line 260.

The pneumatic main line 200 thus pneumatically connects the compressed-air supply 1 and the compressed-air connection 2, wherein, in the pneumatic main line 200, there are arranged the air dryer arrangement 100 and, further in the direction of the compressed-air connection 2, an unblockable check valve 311 and a first throttle 331.

The pneumatically unblockable check valve 311 is, in the present case, a part of the directional valve arrangement 310 which has not only the unblockable check valve 311 but also a controllable ventilation valve 312 connected in series with a second throttle 332 in the ventilation line 230. The pneumatically unblockable check valve 311 is in the present case likewise arranged so as to be connected in series with the first throttle 331 in the pneumatic main line 200, wherein the pneumatic main line 200 is the only pneumatic line of the first pneumatic connection that continues with a further pneumatic line 600 to the pneumatic installation 1002. The series arrangement of first throttle 331 and pneumatically unblockable check valve 311 is thus arranged in the pneumatic main line 200 between the air dryer arrangement 100 and the compressed-air connection 2 to the pneumatic installation 1002.

Furthermore, the compressed-air feed installation 1001 has a second pneumatic connection, specifically the abovementioned ventilation line 230, which is pneumatically connected to the pneumatic main line 200 and to the ventilation connection 3 and to the further filter 3.1 and/or silencer. In the present case, the nominal width of the second throttle 332 is greater than the nominal width of the first throttle 331.

The ventilation valve 312 arranged in the second pneumatic connection is in the present case in the form of a 2/2 valve, which is separate from the pneumatically unblockable check valve 311, in the ventilation line 230.

The controllable ventilation valve 312 is thus, as an indirectly switched relay valve, part of a valve arrangement 300 with a control valve 320 in the form of a 3/2 directional solenoid valve. The control valve 320 can, by means of an electrical control signal, in the form of a voltage and/or current signal, which can be transmitted via an electrical control line 321, be electrically actuated at the coil 322 of the control valve 320. Upon this electrical actuation, the control valve 320 can be transferred from the electrically deenergized position shown in FIG. 1, in which it shuts off the pneumatic control line 250, into a pneumatically opened position, in which pressure discharged from the pneumatic main line 200 via the pneumatic control line 250 is transmitted onward for the pneumatic control of the controllable ventilation valve 312 as relay valve.

The controllable ventilation valve 312 is in the present case additionally equipped with a pressure-limiting means 313. The pressure-limiting means 313 picks off, via a pneumatic control line upstream of the ventilation valve 312, specifically between the second throttle 332 and ventilation valve 312, a pressure which, in the event of a threshold pressure being exceeded, lifts the piston 314 of the ventilation valve 312 off the valve seat counter to the force of an adjustable spring 315, that is to say which moves the controllable ventilation valve 312 into the open position even in the absence of actuation by means of the control valve 320. This prevents an undesirably excessively high pressure from being generated in the pneumatic system 1000.

In the present closed state, the control valve 320 shuts off the control line 250, and is pneumatically connected via a further ventilation line 260 to the ventilation line 240 for ventilation via the ventilation connection 3. In other words, in the closed position of the control valve 320 shown in FIG. 1, a line section 251 of the control line 250 that is situated between the ventilation valve 312 and control valve 320 is connected to the further ventilation line 260 between the control valve 320 and the ventilation connection 3. For this purpose, the further ventilation line 260 connects, at the further branch connection 261, to the ventilation line 230 and to the further ventilation line 240. These are thus merged in a section of a ventilation line 240 that is situated between the further branch connection 261 and the ventilation connection 3.

By means of the control valve 320, it is thus possible, in the presence of a control pressure which is discharged from the pneumatic main line 200 or from the further pneumatic line 600 via the pneumatic control line 250 from the control connection 252, for the ventilation valve 312 to be opened under the exertion of pressure by the piston 314.

In the present case, the piston 314 is designed as a double piston such that it is particularly advantageously provided that the transfer of the control valve 320 into the—in the above sense—opened state leads not only to the opening of the ventilation valve 312 but also to the unblocking of the unblockable check valve 311. In other words, the control valve 320 of the solenoid valve arrangement 300 serves for the actuation of the ventilation valve 312, which is provided separately from the check valve 311, and of the check valve 311. This leads to the air dryer arrangement 100 being pneumatically opened at both sides when the control valve 320 is transferred into the opened position. This further operating position that can be assumed by the compressed-air feed installation 1001 can, during operation, be utilized for the ventilation of the pneumatic installation 1002 and simultaneously for the regeneration of the air dryer arrangement 100.

The operating position of the compressed-air feed installation 1001 shown in FIG. 1 serves, with a flow through the check valve 311 in the pass-through direction, in particular for the filling of the pneumatic installation 1002 via the pneumatic main line 200 and the further pneumatic line 600.

The pneumatic installation 1002 of FIG. 1 in the form of an air spring installation has in this case a number of four so-called bellows 1011, 1012, 1013, 1014, which each are assigned to a wheel of a passenger motor vehicle (not illustrated in any more detail) and form an air spring of the vehicle.

Furthermore, the air spring installation has an accumulator 1015 for storing quickly available compressed air for the bellows 1011, 1012, 1013, 1014. Upstream of said bellows 1011 to 1014, in each case in a spring branch line 601, 602, 603, 604 which proceeds from a gallery 610, there is positioned in each case one solenoid valve 1111, 1112, 1113, 1114, which serves in each case as a ride-height control valve for opening or closing an air spring formed with a bellows 1011 to 1014. The solenoid valves 1111 to 1114 in the spring branch lines 601 to 604 are formed as 2/2 directional valves in a valve block 1110. In an accumulator branch line 605, a solenoid valve 1115 in the form of a further 2/2 directional valve as an accumulator valve is positioned upstream of an accumulator 1015. The solenoid valves 1011 to 1015 are connected by means of the spring and accumulator branch lines 601 to 604 and 605 to a common collecting line, specifically the gallery 610 referred to above, and then to the further pneumatic line 600. The gallery 610 is thus pneumatically connected via the pneumatic line 600 to the compressed-air connection 2 of the compressed-air feed installation 1001. In the present case, the solenoid valves 1111 to 1115 are arranged in a valve block 1010 with the five valves. The solenoid valves are shown in FIG. 1 in an electrically deenergized state—here, the solenoid valves 1111 to 1115 are in the form of solenoid valves which are closed and electrically deenergized. Other, modified embodiments that are not shown here may realize a different arrangement of the solenoid valves—it is also possible for fewer solenoid valves to be utilized in the context of the valve block 1010.

To fill the pneumatic installation 1002, the solenoid valves 1111 to 1114 positioned upstream of the bellows 1011 to 1014, and/or the solenoid valve 1115 positioned upstream of the accumulator 1015, are moved into an opened position.

Nevertheless, in the closed position of the solenoid valves 1111 to 1114 and 1115 in the pneumatic installation 1001—owing to the check valve 311 presently not being unblocked—an operating position of the pneumatic installation 1002 decoupled from the compressed-air feed installation 1001 is possible. In other words, cross-connection of bellows 1011 to 1015 (for example during off-road operation of a vehicle), filling of the bellows 1011 to 1015 from the accumulator 1015 or a pressure measurement in the pneumatic installation 1002 via the gallery 610 can be performed without the compressed-air feed installation 1001 being pressurized.

In particular, owing to the check valve 311 being blocked from the compressed-air connection 2 to the compressed-air supply 1 and owing to the control valve 320 being closed, the air dryer arrangement 100 is protected against unnecessary pressurization with compressed air.

It is thus advantageously the case that pressurization of the air dryer arrangement 100 with compressed air is not advantageous in all operating positions of the pneumatic installation 1002. Rather, for an effective and fast regeneration of the air dryer installation 100, it is advantageous for this to be performed exclusively in the event of a ventilation of the pneumatic installation 1002 from the compressed-air connection 2 to the compressed-air supply 1, with the check valve 311 unblocked.

For this purpose, as discussed above, the control valve 320 is moved into an opened switching position, such that both the ventilation valve 312 opens and the check valve 311 is unblocked. Ventilation of the pneumatic installation 1002 can take place via the first throttle 311, the unblocked check valve 311, with the air dryer arrangement 100 being regenerated, and subsequently via the second throttle 332 and the opened ventilation valve 312 for ventilation via the ventilation connection 3.

In other words, for the simultaneous unblocking actuation of the check valve 311 and opening actuation of the ventilation valve 312, a control piston 314, as a double relay piston which is pneumatically actuatable by the control valve 320, is provided, having a relay ventilation body 314.1 of the ventilation valve and a relay unblocking body 314.2 for the unblockable check valve 311. The double relay piston clarifies the present principle for the unblocking of the check valve 311 and simultaneous actuation of the ventilation valve 312 by means of the two coupled actuating elements—specifically by means of the relay unblocking body 314.2 and the relay ventilation body 314.1—which may be formed as a unipartite double relay body or, in a modification, also as separate bodies. In a particularly preferred modification of a design implementation, the abovementioned actuating elements of the double relay piston may be formed as integral regions of a double relay piston.

Figure 2:
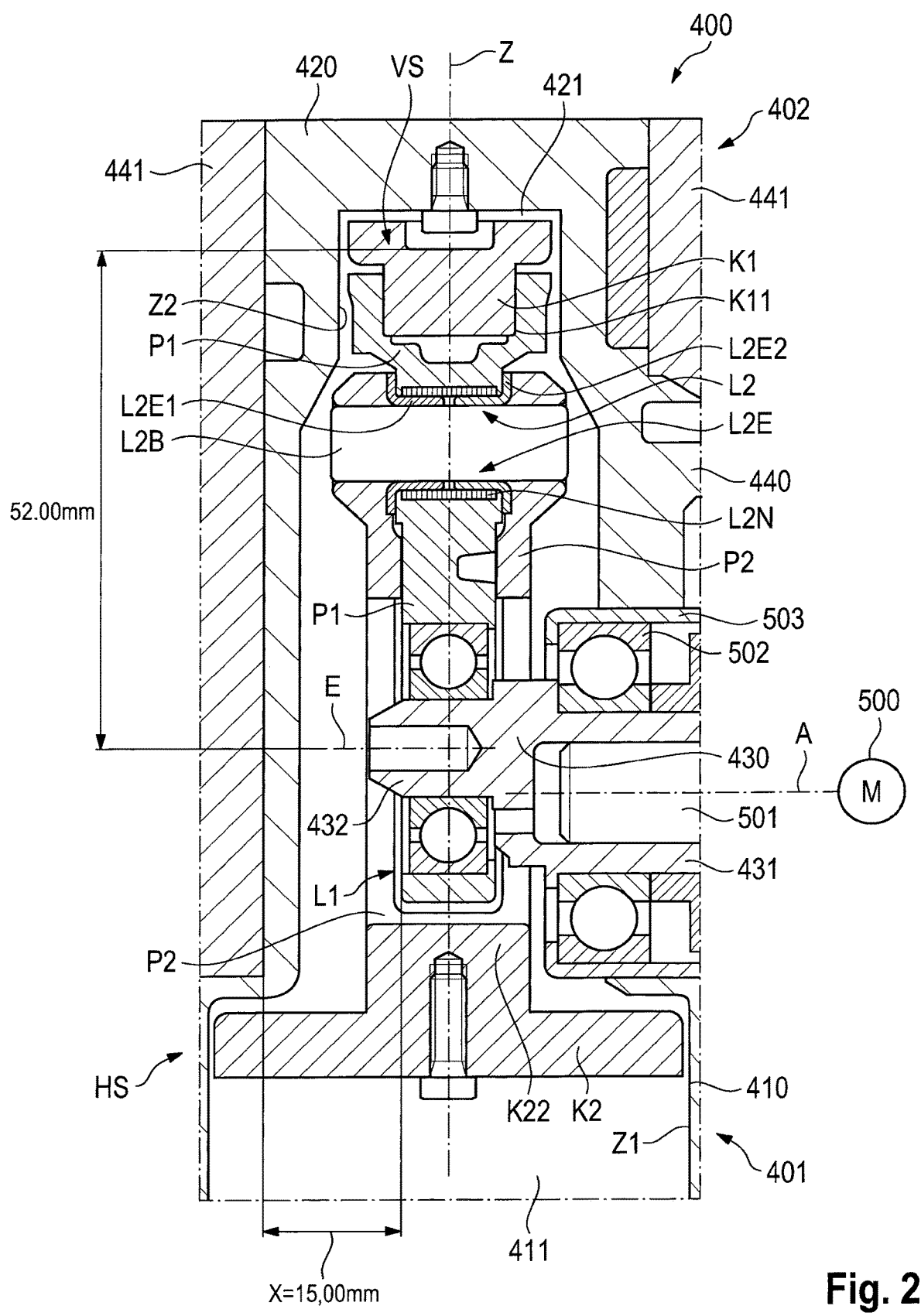
FIG. 2 shows, for an air compressor, a reciprocating-piston machine in the form of a two-stage piston compressor having a first connecting rod for a first piston of a second (high-pressure) stage and having a second connecting rod of a first (low-pressure) stage and having a first connecting-rod bearing and a second connecting-rod bearing, onto which an elastomer element in the form of an elastomer layer is vulcanized.

FIG. 2 now illustrates the details of an embodiment of the invention based on the example of a reciprocating-piston machine, specifically in the form of the two-stage piston compressor 400 of FIG. 1.

Referring to FIG. 2, said figure shows a reciprocating-piston machine in the form of a double compressor as per the detail D of FIG. 1, specifically a twin compressor which is designed as a two-stage piston compressor 400 and which has a first compressor stage 401 and a second compressor stage 402 and which has a motor 500 which, as drive motor M, is coupled by means of a drive shaft 501 to a crankshaft 430 of the piston compressor 400.

For this purpose, the crankshaft 430 has a drive shaft coupling 431 which serves as a receptacle for the drive shaft 501 of the drive motor M. The crankshaft 430 is, at the outside of the drive shaft coupling 431, rotatably mounted in a bearing 502 which, in the present case, is designed as a ring ball bearing. The bearing 502 is in turn held by means of a corresponding holding mechanism on the motor housing 503. In this way, the crankshaft 430, which can be driven by means of the drive motor M during operation, is formed by means of the stated drive shaft coupling 431 for the coupling of the drive shaft 501 of the drive motor 500 for the drive of the crankshaft 430.

The crankshaft 430 furthermore has an eccentric crankshaft journal 432 which is formed eccentrically with respect to the axis A on the crankshaft 430 and which extends along an eccentric axis which in this case is referred to as shaft axis E.

The eccentric crankshaft journal 432 is thus designed to drive a first connecting rod P1 directly and a second connecting rod P2 indirectly when the crankshaft 430 is driven in rotation. For this purpose, the eccentric crankshaft journal 432 is formed by means of a first connecting-rod bearing L1 for the direct mounting and direct drive of the first connecting rod P1. The second connecting rod P2 in turn is movably mounted, as a follower connecting rod, on the first connecting rod P1, which functions as a drive connecting rod P1, by means of a second connecting-rod bearing L2 in the form of a needle bearing L2N and an elastomer element L2E in the form of two elastomer bushings L2E1, L2E2 which enclose a bearing pin L2B. Alternatively, the elastomer element L2E may for example also be designed as an elastomer bushing (not shown). The first connecting-rod bearing L1 is formed as a ring ball bearing. In this exemplary embodiment, the elastomer element L2 in the form of the elastomer bushings L2E1, L2E2 encloses the bearing pin L2B over its full circumference. Alternatively, the elastomer element L2, for example in the form of elastomer ring segments L2ERS (cf. FIG. 13), may also enclose the bearing pin L2B only partially, for example at the top side and bottom side of the bearing pin L2B. In an exemplary embodiment (not shown), the elastomer element L2 in the form of elastomer ring segments L2ERS extends over approximately the upper quarter of the circumference and the lower quarter of the circumference of the bearing pin L2B, such that the lateral quarters of the bearing pin L2B are not in contact with the elastomer element L2. The elastomer element L2 has pronounced damping characteristics, such that the elastomer element L2 permits a noise reduction and a reduction in material wear of the needle bearing L2N. The bearing pin L2B is fixedly connected to the second connecting rod P2. For this purpose, the bearing pin L2B is, at its longitudinal ends, pressed together with the connecting rod P2 by means of a press fit.

The first piston K1 is, by means of a piston holder K11, inserted as a separate part into the head end of the first connecting rod P1 and held there. The second piston K2 is formed integrally and in unipartite fashion on the head end K22 of the second connecting rod P2—that is to say, along a cylinder axis Z, distally opposite the first piston K1. For this purpose, the second connecting rod P2 is, as a unipartite, approximately ring-shaped component, as can be seen in FIG. 2, suspended rotatably at the second connecting-rod bearing L2. It is alternatively also possible for the first piston to be integrally formed on the first connecting rod P1 or for the second piston to be held on the second connecting rod P2 (not shown).

In the case of the construction shown in FIG. 2, when the crankshaft 430 is driven in rotation, an eccentric rotational movement of the crankshaft journal 432 can be realized during the operation of the compressor 400, such that the first and second pistons K1, K2 are respectively moved with a reciprocating movement in order to compress compressed air in the corresponding second and first compressor stage 402, 401.

For this purpose, the second piston K2 of the first compressor stage 401 moves in a cylinder displacement chamber 411 of the first cylinder 410 in the first (low-pressure) compressor stage 401. For this purpose, the first piston K1 moves in a cylinder displacement chamber 421 of a second cylinder 420 of the second (high-pressure) compressor stage 402. The first and second cylinders 410, 420 are part of a housing 440 of the common air compressor with piston compressor 400, drive motor M and crankshaft 430. The housing 440 of the air compressor is held by means of further components 441 on the housing of a compressed-air feed installation 1001 as shown in FIG. 1.

FIG. 2 shows the twin compressor 400, in the present case in an operating position in which the second piston K2 of the (low-pressure) compressor stage 401 is in a stroke position HS, that is to say the compression of the air situated in the displacement chamber 411 is impending. By contrast, the first piston K1 of the second compressor stage 402 is situated in a compression position VS, that is to say compressed air can be discharged in compressed form from the second high-pressure stage 402 to the compressed-air feed installation 1001.

The movement of the first and second pistons K1, K2 during the operation of the piston compressor 400 takes place basically along the cylinder axis Z. The latter lies centrally symmetrically with respect to cylinder lining surfaces Z1 and Z2 of the first and second cylinder displacement chambers 411, 421 for the second and first pistons K2, K1 of the first and second cylinders 410, 420 respectively. In this regard, in FIG. 2, the connecting-rod length of the first connecting rod P1 is indicated as being 52.00 mm, as an example for the order of magnitude of the high-pressure stage 420 of the piston compressor 400.

The first connecting rod P1 may for example also have a connecting-rod length between 50 and 70 mm, in particular a connecting-rod length of 66 mm. The second connecting rod may for example have a connecting-rod length between 40 and 60 mm, in particular a connecting-rod length of 53 mm. In the case of a connecting-rod length of the second connecting rod of 53 mm, the spacing between a piston head of the piston K2 and the eccentric crankshaft journal 432 may amount to for example between 15 and 25 mm, in particular 21 mm. The abovementioned dimensions can permit a deflection angle of the connecting rods relative to one another of up to 20°, for example 14°, and +/−7° and in particular 7°.

In this exemplary embodiment, the bearing pin L2B has a diameter of 8 mm and may have diameters between 5 mm and 12 mm. In this exemplary embodiment, the diameter of the bearing pin L2B is constant. The diameter of the bearing pin L2B may also vary along its longitudinal axis. For this exemplary embodiment, the maximum rotational speed amounts to up to 2700 revolutions per minute, resulting in a maximum sliding speed of approximately 0.14 m/s, in particular 0.137 m/s. The maximum rotational speed preferably amounts to between 1500 and 3500 revolutions per minute.

The cylinder axis Z is oriented so as to run along a radius around the shaft axis E (eccentric axis E). The shaft axis E runs exactly perpendicular to the cylinder axis Z. That is to say, the eccentric crankshaft journal 432 of the crankshaft 430 is likewise arranged exactly perpendicular to the cylinder axis Z in the piston compressor 400. Sufficiently reliable and sealed running of the second and first pistons K2, K1 in the first (low-pressure) compressor stage and (high-pressure) compressor stage 401, 402 respectively is thus ensured owing to the running direction of the pistons K2, K1 likewise along the cylinder axis Z.

For this purpose, the arrangement of the first connecting rod P1 with piston K1 or of the second connecting rod P2 with piston K2 is realized such that these are mounted by means of the first connecting-rod bearing L1 and the second connecting-rod bearing L2 respectively exactly along the cylinder axis Z; for example with an installation dimension of X=15.00 mm.

As a result, a reciprocating-piston machine in the form of a twin compressor 400 with first and second compressor stages 401, 402 is provided, in the case of which the first connecting rod P1 of the second, specifically (high-pressure) compressor stage 402 is formed, wherein the first connecting rod P1 is mounted by means of the connecting-rod bearing L1 directly on the crankshaft journal 432—that is to say as a drive connecting rod—and the second connecting rod P2 of the first, in this case (low-pressure) compressor stage 401 is formed, wherein the second connecting rod P2 is mounted by means of the second connecting-rod bearing L2 indirectly on the crankshaft journal 432, that is to say directly on the first connecting rod P1—that is to say as a follower connecting rod on the drive connecting rod.

The above-described embodiments with drive connecting rod and follower connecting rod have duly proven to be particularly advantageous for a twin compressor. Embodiments of the invention are however not restricted thereto.

Figure 3:
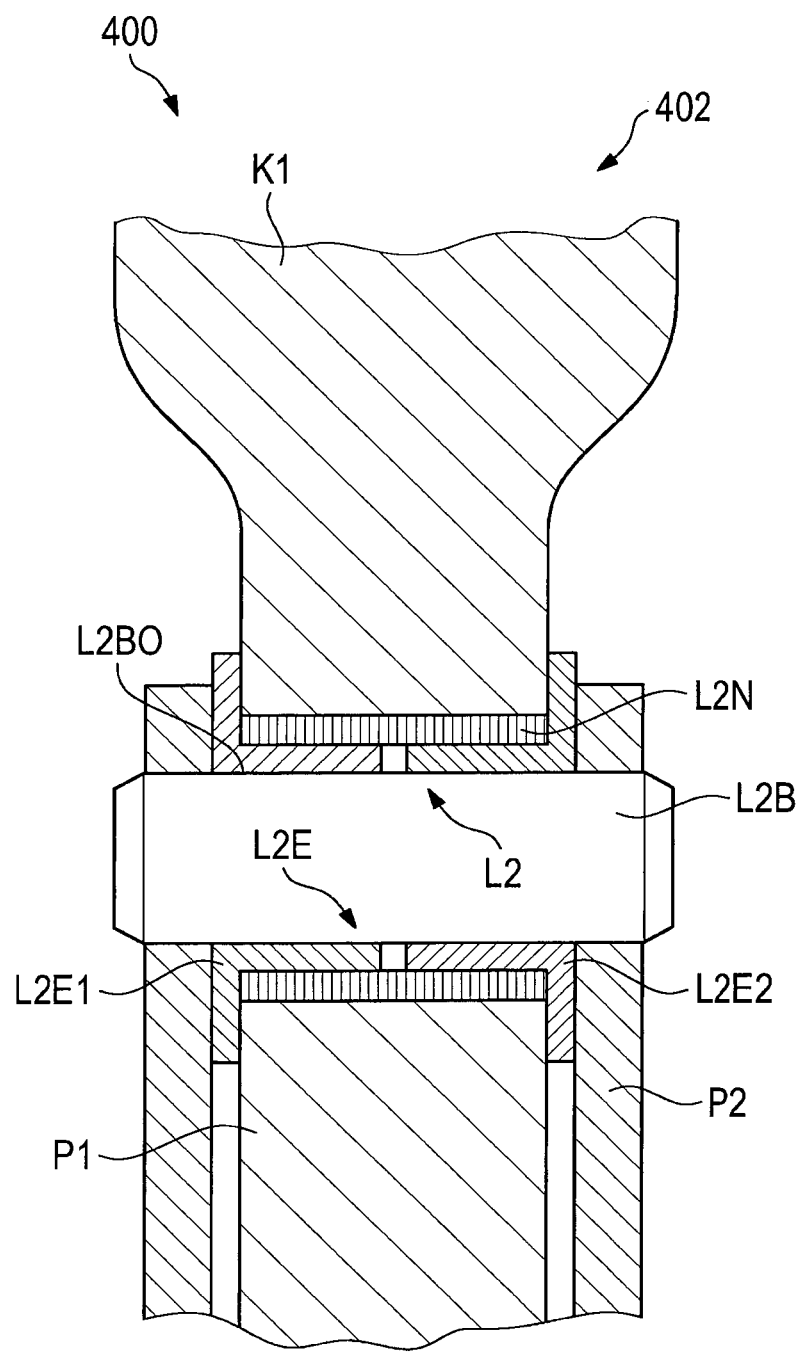
FIG. 3 shows a detail of a further exemplary embodiment of a reciprocating-piston machine in the form of a two-stage piston compressor having a first connecting rod for a first piston of a second (high-pressure) stage, and having a second connecting rod, in a sectional view.

FIG. 3 shows a detail of a further exemplary embodiment of a reciprocating-piston machine in the form of a two-stage piston compressor 400.

The piston compressor 400 has a first connecting rod P1 and a second connecting rod P2, which are rotatable about a bearing pin L2B. The bearing pin L2B is composed of steel and, in the region of its two longitudinal ends, is fixed in the second connecting rod P2 by means of a press fit. Two elastomer elements L2E in the form of two elastomer bushings L2E1 and L2E2 are pressed onto a bearing pin surface L2BO of the bearing pin L2B.

The elastomer bushings L2E1 and L2E2 are, in this exemplary embodiment, composed of a plastic with good damping characteristics. The elastomer bushings L2E1 and L2E2 permit a quieter operating noise owing to their damping characteristics. In this exemplary embodiment, the elastomer bushings L2E1 and L2E2 do not make contact with one another. Alternatively, it is also possible for the elastomer bushings L2E1 and L2E2 to extend over the bearing pin surface L2BO along the longitudinal axis of the bearing pin L2B such that they make contact with one another (not shown). It is furthermore also possible for an elastomer element L2E in the form of an elastomer bushing which extends over the bearing pin L2B to be arranged so as to completely enclose that part of the bearing pin surface L2BO which is situated in the section of the first connecting rod P1 (not shown).

An inner ring of a needle bearing L2N is pressed onto the two elastomer bushings L2E1 and L2E2. The outer ring of the needle bearing L2N is pressed into the first connecting rod P1.

The elastomer bushings L2E1 and L2E2 furthermore each have a collar which encloses or encases and seals off the needle bearing L2N such that lubricant, such as for example lubricating grease, lubricating oil or the like, cannot escape from the needle bearing L2N. For this purpose, the collar of the elastomer bushings L2E1 and L2E2 enhances the damping characteristics of the elastomer bushings L2E1 and L2E2.

In this exemplary embodiment, the outer ring of the needle bearing L2N has rolls or needles which, during the operation of the reciprocating-piston machine in the form of the two-stage piston compressor 400, run on the outer surface of the inner ring of the needle bearing L2N. For this purpose, the needle bearing L2N serves for the mounting of the first connecting rod P1.

The use of the elastomer bushings L2E1 and L2E2 with the needle bearing L2N combines the advantage of the needle bearing, that is to say the long service life, with the advantage of the plain bearing, specifically the lower sound volume during operation.

In an embodiment which is not shown and which is less preferred, the needle bearing L2N may also be formed without an inner ring. In this case, the rolls or needles of the outer ring of the needle bearing L2N run on the elastomer bushings L2E1 and L2E2. This duly makes it possible to lower the sound volume during operation, but in so doing increases the wear. Furthermore, it is alternatively also possible for the inner ring of the needle bearing L2N to be an elastomer inner ring or an elastomer bushing on which the rolls of the outer ring of the needle bearing L2N run during operation (not shown).

Figure 4:
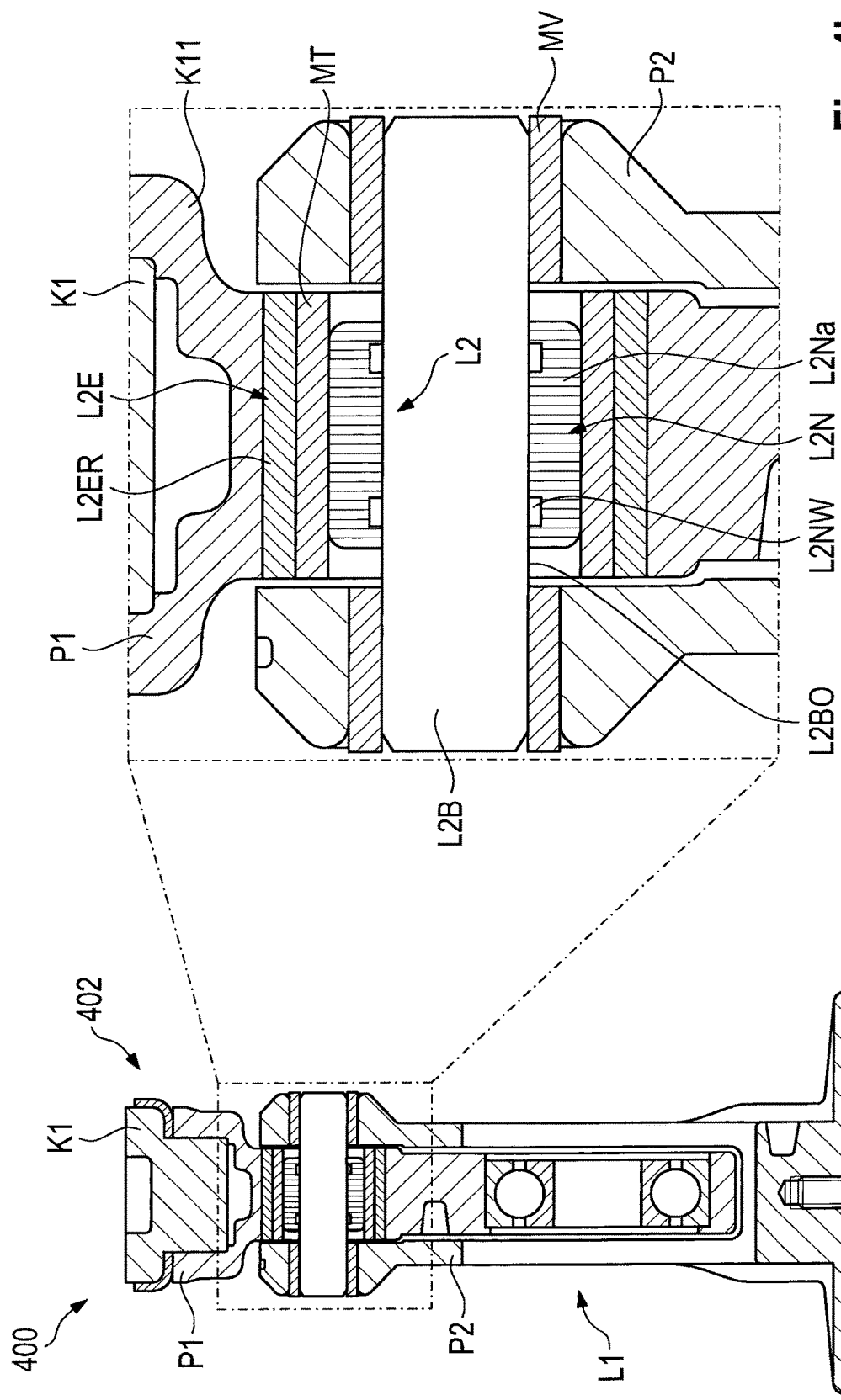
FIG. 4a shows, for an air compressor, a reciprocating-piston machine in the form of a two-stage piston compressor having a first connecting rod for a first piston of a second (high-pressure) stage and having a second connecting rod for a second piston of a first (low-pressure) stage, in a sectional view.
FIG. 4b shows a detail of the reciprocating-piston machine in the form of a two-stage piston compressor of FIG. 4a having a first connecting rod for a piston of a second (high-pressure) stage and having a second connecting rod and a bearing pin that connects the first and second connecting rods, which bearing pin is connected by means of a second connecting-rod bearing, a metal support and an elastomer element to the second connecting rod.

FIG. 4a shows a detail of a reciprocating-piston machine in the form of a two-stage piston compressor 400 with a first connecting rod P1 for a first piston K1 of a second (high-pressure) stage 402 and with a second connecting rod P2 with a second piston K2 of a first (low-pressure) stage 401. The first connecting rod P1 has a first connecting-rod bearing L1. In this exemplary embodiment, the first piston K1 is held by the piston holder K11 (see FIG. 4b), though may also, in an alternative exemplary embodiment, be formed integrally on the connecting rod P1.

In the detail of the piston compressor 400 shown in FIG. 4b, a second connecting-rod bearing L2 is shown. The second connecting-rod bearing L2 has an outer ring L2Na of a needle bearing L2N, which outer ring is arranged around a bearing pin L2B. The rolls L2NW of the needle bearing L2N run on a bearing pin surface L2BO of the bearing pin L2B during the operation of the piston compressor 400. Alternatively, instead of rolls, the needle bearing L2N may also have rollers, needles or the like.

The outer ring L2Na of the needle-roller bearing L2N is connected by means of a metal support MT in the form of an inner metal sleeve MTi to an elastomer element L2E in the form of an elastomer ring L2ER, which is pressed between the metal support MT in the form of the inner metal sleeve MTi and a connecting-rod inner surface of the connecting rod P1. Alternatively, the elastomer ring L2ER may also be enclosed on both sides by metal supports, for example by an inner metal sleeve and an outer metal sleeve (not shown). Furthermore, the metal support MT may also be arranged around the elastomer ring L2ER as an outer metal sleeve MTa between elastomer ring L2ER and connecting-rod inner surface of the first connecting rod P1 (not shown). Furthermore, the elastomer element L2E may also be injection-molded as an elastomer layer between the inner metal sleeve MTi and the connecting-rod inner surface of the second connecting rod P2 (not shown). The elastomer element L2E may also, as an elastomer ring L2ER without a metal support MT, be pressed in directly between the outer ring L2Na of the needle bearing L2N and the connecting-rod inner surface of the second connecting rod P2. The elastomer ring L2ER serves for dampening the noises generated by the rolls or needles.

The bearing pin L2B is furthermore firmly connected to the second connecting rod P2 by means of metal press-fit connection elements MV in a metal press-fit connection.

The hardness and further material characteristics of the elastomer element L2E in the form of the elastomer ring L2ER are dependent on the material of the elastomer that is used. The elastomer ring L2ER in this exemplary embodiment is composed of rubber or of a rubber mixture. It is alternatively also possible for some other elastic material was good damping characteristics to be used. The height, width, length, wall thickness and the diameter of the elastomer ring L2ER are freely selectable and serve for setting the characteristics of the elastomer ring L2ER. The above-mentioned parameters are preferably adapted to the operating conditions and to the piston compressor 400. This serves in particular for optimally adapting the dampening and/or resilient characteristics of the elastomer ring L2ER to the operating conditions and thus permitting an optimum noise reduction.

Figure 5:
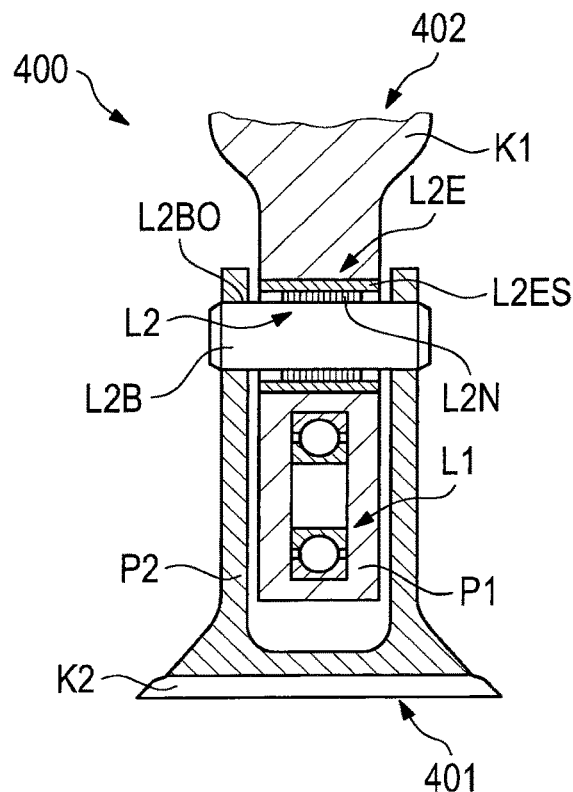
FIG. 5 shows, for an air compressor, a reciprocating-piston machine in the form of a two-stage piston compressor, having a first connecting rod for a first piston of a second (high-pressure) stage and having a second connecting rod of a first (low-pressure) stage and having a first connecting-rod bearing and a second connecting-rod bearing in the form of a needle bearing, onto which an elastomer element in the form of an elastomer layer is vulcanized, in a sectional view.

FIG. 5 shows a reciprocating-piston machine in the form of a two-stage piston compressor 400 having a first connecting rod P1 and a second connecting rod P2, which are connected to one another by means of a bearing pin L2B and which are rotatable about said bearing pin. The bearing pin L2B is firmly connected, in the region of its longitudinal ends, to the second connecting rod P2 by means of a press fit.

The first connecting rod P1 has an integrally formed first piston K1 for a second (high-pressure) compressor stage 402, and the second connecting rod P2 has an integrally formed second piston K2 for a first (low-pressure) compressor stage 401.

A first connecting-rod bearing L1 serves for the mounting of an eccentric crankshaft journal 432 which, when a crankshaft 430 is driven in rotation, can drive the first connecting rod P1 directly and the second connecting rod P2 indirectly (not shown).

The first connecting rod P1 is connected by means of a second connecting-rod bearing L2 in the form of a needle bearing L2N and an elastomer element L2E in the form of an elastomer layer L2ES to the bearing pin L2B. The elastomer layer L2ES is vulcanized directly onto the outer ring of the needle bearing L2N and is pressed together with the first connecting rod P1.

The direct vulcanizing-on makes it possible to omit an additional component, for example a metal bushing. The elastomer layer L2ES serves for permitting a deflection of the connecting rods P1 and P2 relative to one another and, in the process, reducing the introduction of body-borne sound into further components, by virtue of the elastomer absorbing said energy. The impact speeds of the connecting rods P1 and P2 during the deflection relative to one another at the forced reversal points is, by means of the elastomer element L2E, transmitted in dampened fashion to the following components. The needle bearing L2N is subjected alternately to tension and compression in a radial direction. Between the two maxima, there is a force-free point in time at which the connecting-rod bearing clearance is passed through. The greater this connecting-rod bearing clearance, the greater the running speed or momentum in the connecting rods P1 and P2 when the opposite compression or tension point is reached, and the more intense the impact that is dampened by the elastomer element L2E. Through the use of the elastomer element L2E, the excitation of body-borne sound in the piston compressor 400 as a whole is thus reduced.

Alternatively, for the second connecting-rod bearing L2, instead of the needle bearing L2N, use may also be made of a plain bearing, a ball bearing or a spherical bearing (not shown). The plain bearing is preferably a metal plain bearing. It is also possible for an elastomer layer L2ES to be vulcanized onto each of the alternative second connecting-rod bearings L2, or alternatively, an elastomer ring L2ER may surround said connecting-rod bearing (not shown). It is alternatively also possible for an inner ring L2Ni of a needle bearing L2N in the form of a needle sleeve with rolls or needles to be arranged on an outer surface of the inner ring L2Ni around the bearing pin L2B. In this case, it is preferable for an inner metal sleeve MTi to be arranged around the inner ring L2Ni, the inner surface of which metal sleeve serves as a raceway for the rolls or needles of the inner ring L2Ni of the needle bearing L2N. The inner metal sleeve MTi is in this case connected by means of the elastomer element L2E to the first connecting rod P1. In this case, too, the elastomer element L2E is a vulcanized-on elastomer layer L2ES. The elastomer element L2E may however also be used in the form of an elastomer ring L2ER.

In an exemplary embodiment which is not shown, the elastomer element L2E extends along the longitudinal axis of the bearing pin L2B over the entire bearing pin surface L2BO, situated between the connecting rod P2, of the bearing pin L2B. In this way, abutment or stop disks, which serve for preventing the connecting rods from striking one another in the direction of the longitudinal axis of the bearing pin L2B, can be omitted. In the exemplary embodiment that is not shown, this object is performed by the elastomer element L2E, which extends over the bearing pin surface L2BO. Furthermore, the elastomer element L2E which extends over the bearing pin surface L2BO serves for sealing off the second connecting-rod bearing L2, such that lubricant, such as for example lubricating grease, lubricating oil or the like, cannot escape. Improved dampening of the sound volume is also made possible.

Figure 6:
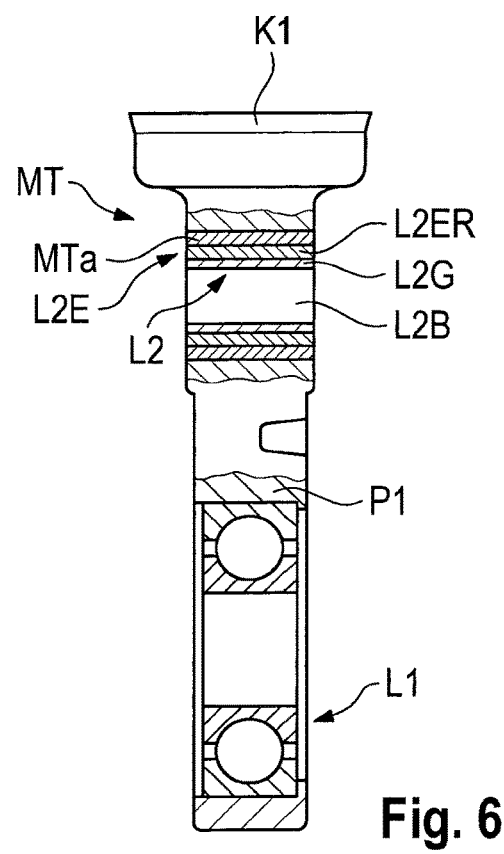
FIG. 6 shows, for a reciprocating-piston machine in the form of a two-stage piston compressor, a first connecting rod having a first piston and having a first connecting-rod bearing and a second connecting-rod bearing in the form of a plain bearing, around which an elastomer element in the form of an elastomer ring and a metal support in the form of an outer ring composed of brass are arranged, in a sectional view.

FIG. 6 shows a first connecting rod P1 for a two-stage piston compressor. A first piston K1 is integrally formed on the connecting rod P1 at one longitudinal end of the connecting rod P1. In the region of the other longitudinal end of the connecting rod P1, there is arranged a first connecting-rod bearing L1, which serves for the mounting of an eccentric crankshaft journal 432 which, when a crankshaft 430 is driven in rotation, can directly drive the first connecting rod P1 (not shown).

The first connecting rod P1 has a second connecting-rod bearing L2 in the form of a plain bearing L2G, in this exemplary embodiment a plain bearing bushing, which is arranged between a connecting-rod inner surface of the first connecting rod P1 and a bearing pin L2B. The plain bearing L2G is enclosed and dampened by an elastomer element L2E in the form of an elastomer ring L2ER. It is alternatively also possible for an elastomer layer to be used for the dampening of the plain bearing L2G (not shown). The elastomer ring L2ER is enclosed by a metal support MT in the form of an outer metal sleeve MTa, which is pressed together with the connecting-rod inner surface of the first connecting rod P1. In this exemplary embodiment, the metal sleeve MTa is a brass ring. In this exemplary embodiment, the elastomer element L2E is composed of rubber or of a rubber mixture with good damping characteristics.

In an exemplary embodiment that is not shown, an elastomer layer is applied to the outer metal sleeve MTa, in particular by being injection-molded on, vulcanized on or similar (not shown). The elastomer element L2E may be configured with a progressive resilience characteristic curve (not shown). Furthermore, the elastomer element L2E may have protuberances L2EA, which serve for the additional resilient mounting of the plain bearing L2G (cf. FIGS. 10, 11 and 13).

The use of a plain bearing L2G makes it possible to realize a larger contact area and thus reduce the surface loading. By virtue of the fact that the plain bearing L2G is dampened from the outside, that is to say the elastomer element L2E is arranged around the plain bearing L2G, improved transmission of body-borne sound into the elastomer element L2E is realized. The elastomer element L2E then serves for reducing the sound volume. The elastomer element L2E furthermore makes it possible for a connecting-rod bearing clearance to be compensated. This permits reduced surface wear and thus a longer service life. The costs for a plain bearing L2G can be lower than for rolling bearings, such as for example needle-roller bearings, ball bearings, spherical bearings or the like.

Figure 7:
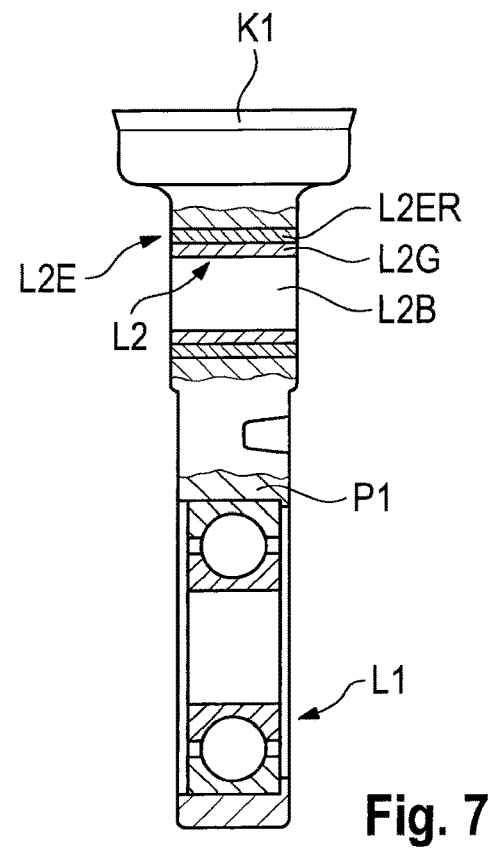
FIG. 7 shows, for a reciprocating-piston machine in the form of a two-stage piston compressor, a first connecting rod having a first piston and having a first connecting-rod bearing and a second connecting-rod bearing in the form of a plain bearing, around which an elastomer element in the form of an elastomer ring is arranged, in a sectional view.
Figure 8:
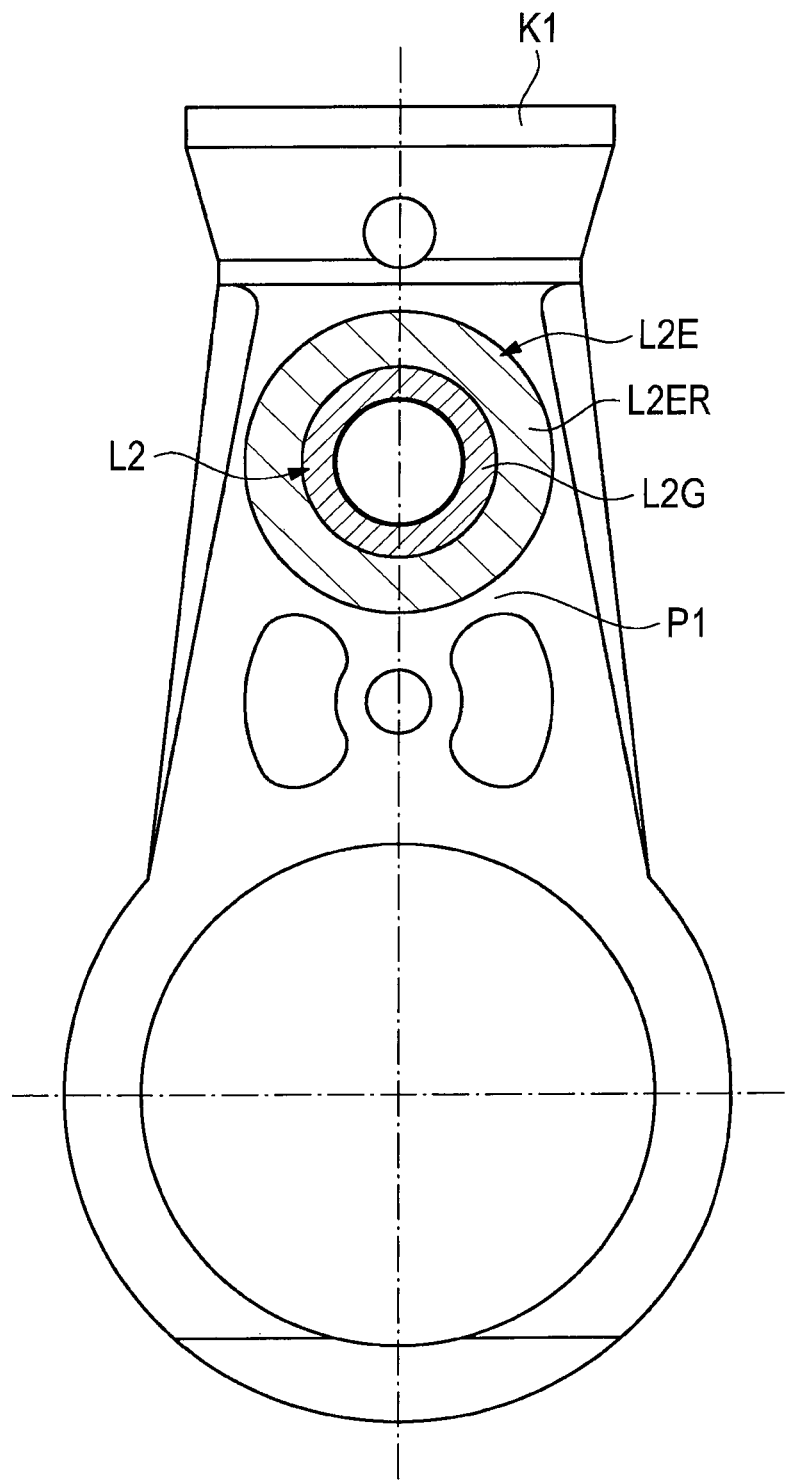
FIG. 8 shows, for a reciprocating-piston machine in the form of a two-stage piston compressor, a first connecting rod having a first piston and having a second connecting-rod bearing in the form of a plain bearing, around which an elastomer element in the form of an elastomer ring is arranged, in a sectional view.

FIG. 7 shows a further exemplary embodiment of a first connecting rod P1 for a two-stage piston compressor, in a sectional view. The first connecting rod P1 of FIG. 7 is substantially identical, aside from the components in the region of the second connecting-rod bearing L2, to the first connecting rod P1 of FIG. 6. A first piston K1 is integrally formed on the connecting rod P1 at one longitudinal end of the connecting rod P1. In the region of the other longitudinal end of the connecting rod P1, there is arranged a connecting-rod bearing L1 which serves for the mounting of an eccentric crankshaft journal 432 which, when a crankshaft 430 is driven in rotation, can directly drive the first connecting rod P1 (not shown). FIG. 8 shows the first connecting rod of FIG. 7 in a side view without an installed first connecting-rod bearing L1.

By contrast to the first connecting rod P1 from FIG. 6, the first connecting rod P1 of FIG. 7 does not have an outer metal sleeve. Instead, an elastomer element L2E in the form of an elastomer ring L2ER and a connecting-rod bearing L2 in the form of a plain bearing L2G are arranged between the connecting-rod inner surface of the first connecting rod P1 and the bearing pin L2B. The elastomer ring L2ER is pressed between the connecting-rod inner surface of the first connecting rod P1 and the plain bearing L2G. The plain bearing L2G is in this case a plain bearing bushing which is arranged around the bearing pin L2B and which permits a mounting of the first connecting rod P1 around the bearing pin L2B.

Alternatively, instead of the elastomer ring L2ER, it is also possible for an elastomer layer L2ES (not shown) to be used, which may for example be injection-molded or vulcanized or similar onto the connecting-rod inner surface of the first connecting rod P1. Furthermore, instead of the elastomer ring L2ER, it is also possible for multiple elastomer ring segments L2ERS to be arranged between the plain bearing L2G and connecting-rod inner surface of the first connecting rod P1 (not shown). In particular, it is possible for two half-ring-shaped elastomer ring segments L2ERS to be used for dampening purposes (not shown).

The schematic illustrations in FIGS. 9a, 9b, 9c and 9d show a layered structure in the region of the second connecting-rod bearing L2. For better clarity, further components of the first connecting rod P1 are not illustrated in FIGS. 9a, 9b, 9c and 9d, despite being present. FIGS. 9a, 9b, 9c and 9d show that different layer configurations of the elastomer element L2E and of the metal supports MT between bearing pin L2B and a connecting-rod inner surface of the first connecting rod P1 are possible.

The connecting-rod bearings L2 shown in FIGS. 9a, 9b, 9c and 9d, in each case in the form of a needle bearing L2N, have an outer ring and an inner ring. They may alternatively also have only an outer ring or an inner ring. These may both have rollers, rolls or needles which, during operation, can run on a surface situated opposite the respective roll or needle. The rolls or needles can thus, during operation, run on an outer surface of the inner ring of the needle bearing L2N, on an inner surface of the outer ring of the needle bearing L2N, on a bearing pin surface, on an inner surface of an inner metal sleeve MTi, or on an inner surface of an elastomer layer L2ES. The outer ring and the inner ring may each also be rings of needles, such that these, on their outer surface and inner surface, have rolls or needles which can run on the surface adjacent to the rolls or needles.

Figure 9A:
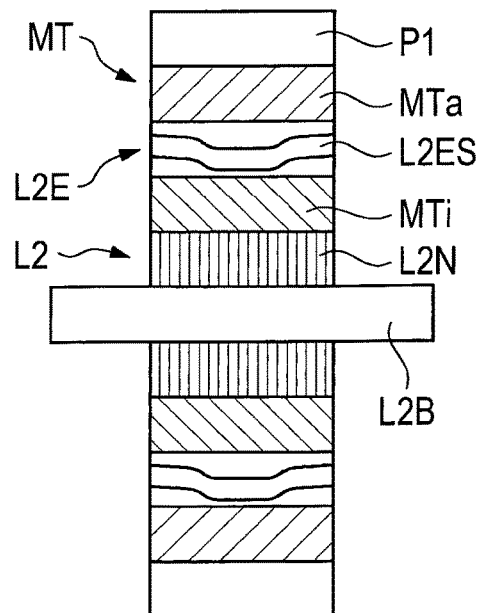
FIG. 9a shows a detail of a first connecting rod having a second connecting-rod bearing in the form of a needle bearing, having an elastomer element and having an outer metal support, which are arranged around a bearing pin, between the bearing pin and the first connecting rod.

FIG. 9a shows a detail of a first connecting rod P1 with a second connecting-rod bearing L2 in the form of a needle bearing L2N, with a metal carrier MT in the form of an inner metal sleeve MTi, with an elastomer element L2E in the form of an elastomer layer L2ES, and with a metal support MT in the form of an outer metal sleeve MTa, which are arranged around a bearing pin L2B, between the bearing pin L2B and the first connecting rod P1.

Figure 9B:
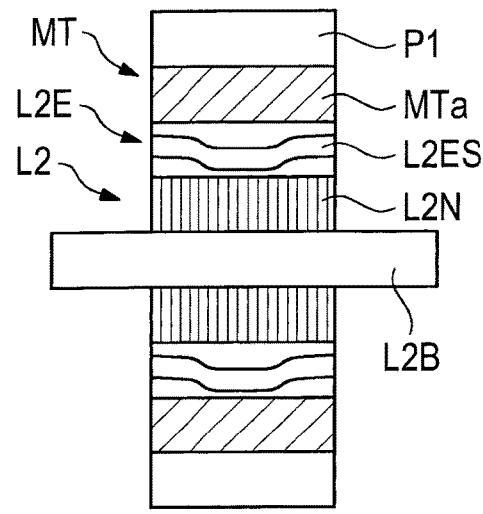
FIG. 9b shows a detail of a first connecting rod having a second connecting-rod bearing in the form of a needle bearing, having an elastomer element and having an outer metal support, which are arranged around a bearing pin, between the bearing pin and the first connecting rod.

FIG. 9b shows a detail of a first connecting rod P1 with a second connecting-rod bearing L2 in the form of a needle bearing L2N, with an elastomer element L2E in the form of an elastomer layer L2ES, and with a metal support MT in the form of an outer metal sleeve MTa, which are arranged around a bearing pin L2B, between the bearing pin L2B and the first connecting rod P1.

Figure 9C:
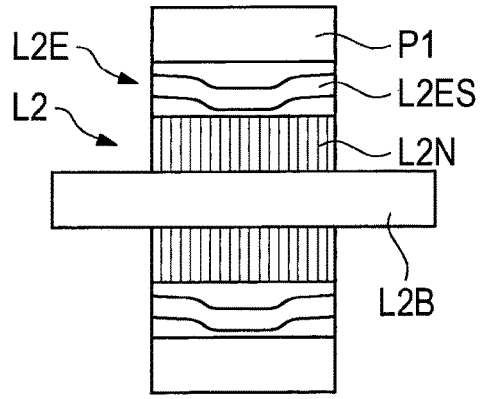
FIG. 9c shows a detail of a first connecting rod having a second connecting-rod bearing in the form of a needle bearing and having an elastomer element, which are arranged around a bearing pin, between the bearing pin and the first connecting rod.

FIG. 9c shows a detail of a first connecting rod P1 with a second connecting-rod bearing L2 in the form of a needle bearing L2N and with an elastomer element L2E in the form of an elastomer layer L2ES, which are arranged around a bearing pin L2B, between the bearing pin L2B and the first connecting rod P1.

Figure 9D:
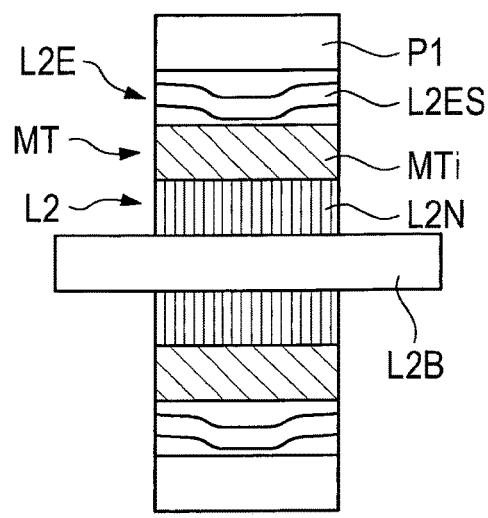
FIG. 9d shows a detail of a first connecting rod having a second connecting-rod bearing in the form of a needle bearing, having an inner metal support and having an elastomer element, which are arranged around a bearing pin, between the bearing pin and the first connecting rod.

FIG. 9d shows a detail of a first connecting rod P1 with a second connecting-rod bearing L2 in the form of a needle bearing L2N, with a metal support MT in the form of an inner metal sleeve MTi, and with an elastomer element L2E in the form of an elastomer layer L2ES, which are arranged around a bearing pin L2B, between the bearing pin L2B and the first connecting rod P1.

Figure 10:
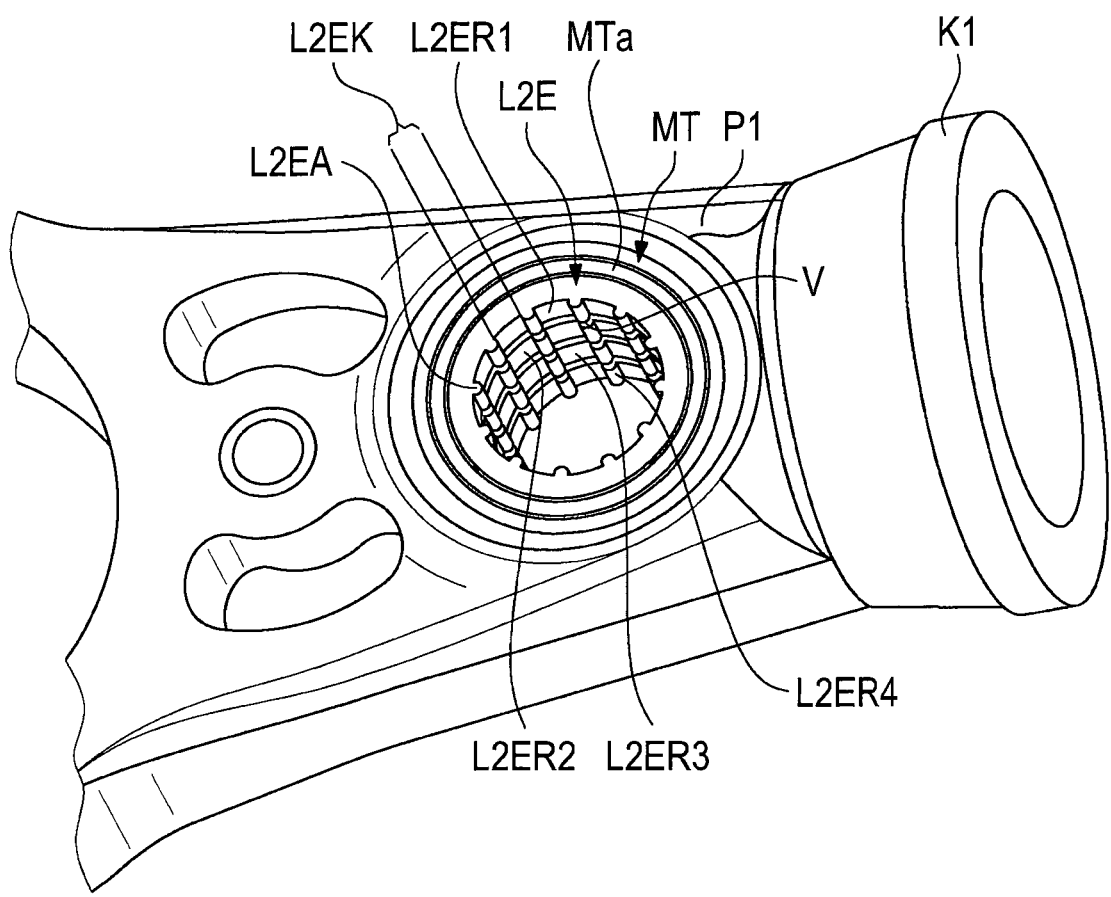
FIG. 10 shows a first perspective illustration of a first connecting rod having a first piston and having an outer metal support and elastomer element arranged in the first connecting rod.
Figure 11:
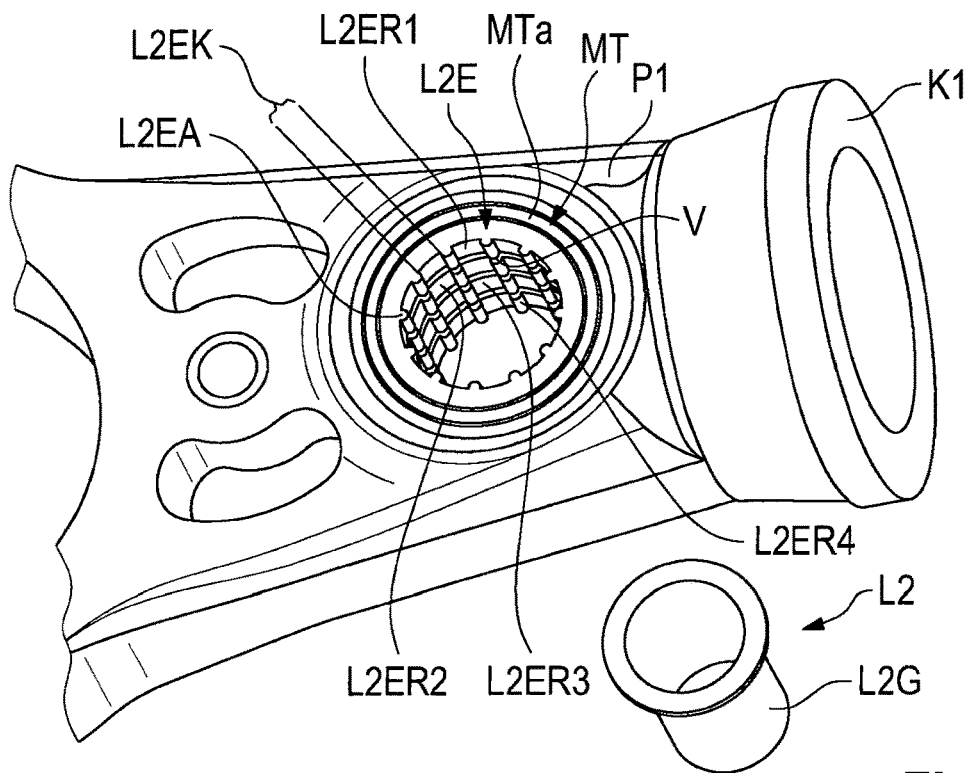
FIG. 11 shows a second perspective illustration of the first connecting rod of FIG. 10, additionally having a second connecting-rod bearing, in the form of a plain bearing, for arrangement within the elastomer element.
Figure 12:
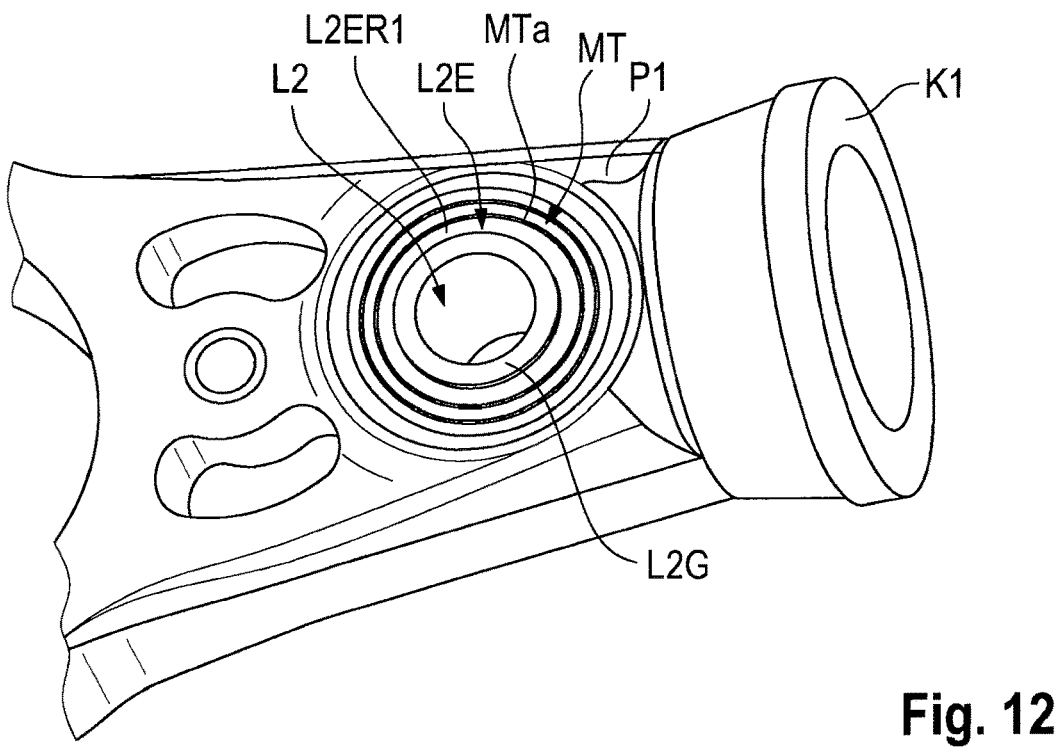
FIG. 12 shows a third perspective illustration of the first connecting rod of FIG. 10, having a plain bearing arranged within the elastomer element.

FIG. 10 shows a first perspective illustration of a first connecting rod P1 with an integrally formed first piston K1 and with a metal support MT which is arranged in the first connecting rod P1 and which is in the form of an outer metal sleeve MTa and with four elastomer elements L2E in each case in the form of an elastomer ring L2ER1, L2ER2, L2ER3, L2ER4. During operation, a second connecting-rod bearing L2 in the form of a plain bearing L2G is arranged within the elastomer rings L2ER1, L2ER2, L2ER3 and L2ER4 (cf. FIGS. 11 and 12). FIG. 11 shows a second perspective illustration of the first connecting rod of FIG. 10, in the case of which the plain bearing L2G is situated adjacent to the first connecting rod P1. FIG. 12 shows a third perspective illustration of the first connecting rod P1, in the case of which the second connecting-rod bearing L2 in the form of the plain bearing L2G is arranged within the elastomer elements L2E in the form of the elastomer rings L2ER1, L2ER2, L2ER3 and L2ER4.

The elastomer rings L2ER1, L2ER2, L2ER3 and L2ER4 have elastomer protuberances L2EA along their circumference. The elastomer protuberances L2EA have constant angular intervals to one another, such that chambers L2EK of equal size are formed between the elastomer protuberances L2EA when the plain bearing L2G is arranged within the elastomer rings L2ER1, L2ER2, L2ER3 and L2ER4. A lubricant, for example lubricating grease, lubricating oil or some other friction-reducing medium, is conducted within the chambers L2EK, in order to improve the sliding characteristics of the plain bearing L2G. In this exemplary embodiment, the elastomer rings L2ER1, L2ER2, L2ER3 and L2ER4 have a spacing to one another along the longitudinal axis of the bearing pin L2B (not shown), such that additional volumes V are formed between the elastomer rings L2ER1, L2ER2, L2ER3 and L2ER4, in which volumes the lubricant is in direct contact with the plain bearing L2G when the latter is arranged within the elastomer rings L2ER1, L2ER2, L2ER3 and L2ER4.

Instead of four elastomer elements L2E, it is also possible for only one elastomer element L2E, or two, three, five or more elastomer elements L2E, to be arranged along the longitudinal axis of the bearing pin L2B (not shown). It is also possible, instead of elastomer rings L2ER1, L2ER2, L2ER3 and L2ER4, for elastomer ring segments L2ERS (see FIG. 13) to be arranged around the circumference of the bearing pin L2B (not shown). In particular, it is possible for multiple elastomer ring segments L2ERS to enclose the plain bearing L2G fully or only partially with respect to the circumference thereof.

In this exemplary embodiment, the elastomer protuberances L2EA are composed of the same material as the respective ring body of the respective elastomer ring L2ER1, L2ER2, L2ER3 and L2ER4. Alternatively, the elastomer protuberances L2EA may also be composed of an elastomer material with more pronounced resilience characteristics than those of the ring body of the elastomer rings L2ER1, L2ER2, L2ER3 and L2ER4. In this case, the ring bodies of the elastomer rings L2ER1, L2ER2, L2ER3 and L2ER4 serve substantially for dampening, whereas the elastomer protuberances L2EA serve for generating a resilient action.

In an alternative exemplary embodiment, the elastomer rings L2ER1, L2ER2, L2ER3 and L2ER4 are designed with a progressive resilience characteristic curve.

Figure 13:
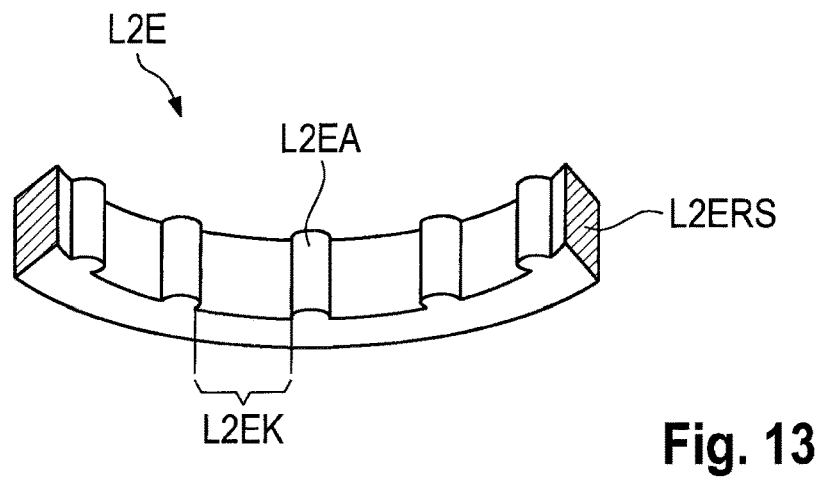
FIG. 13 shows an elastomer ring segment with elastomer protuberances and chambers formed between the elastomer protuberances.

FIG. 13 shows an elastomer element L2E in the form of an elastomer ring segment L2ERS with elastomer protuberances L2EA and chambers L2EK formed between the elastomer protuberances L2EA.

The length of the elastomer ring segment L2ERS is variable. It is possible for multiple elastomer ring segments to be arranged along a circumference or in multiple layers between a bearing pin L2B and a connecting-rod inner surface of a first connecting rod P1 for the purposes of dampening and/or resiliently mounting a second connecting-rod bearing L2 (not shown).

Figure 14:
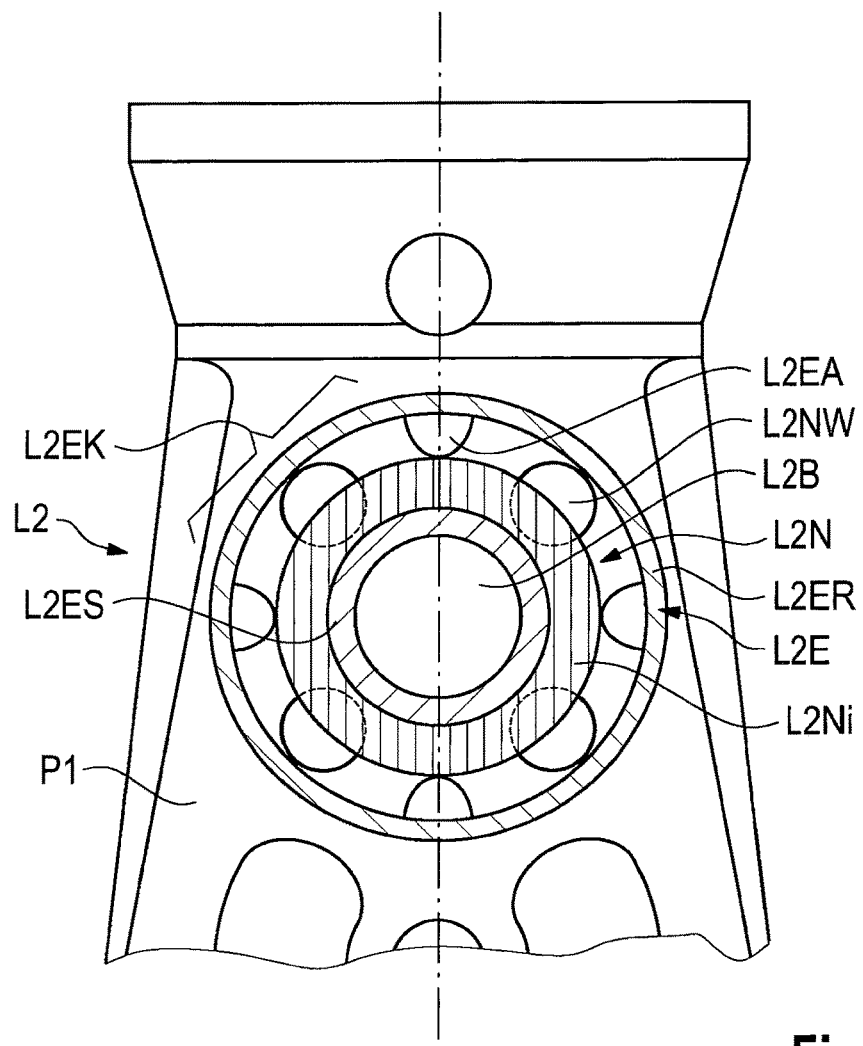
FIG. 14 shows a detail of a first connecting rod, between the connecting-rod inner surface of which and a bearing pin there is arranged an elastomer element in the form of an elastomer ring with protuberances, a second connecting-rod bearing in the form of an inner ring of a needle bearing, and a further elastomer element in the form of an elastomer layer, in a side view.

FIG. 14 shows a first connecting rod P1 which is mounted by means of a second connecting-rod bearing L2 around a bearing pin L2B.

An elastomer element L2E in the form of an elastomer layer L2ES is injection-molded between the bearing pin L2B and inner ring L2Ni of a needle bearing L2N and connects these to one another. The inner ring L2Ni has rolls L2NW which run on an elastomer inner surface of an elastomer element L2E in the form of an elastomer ring L2ER. The elastomer element L2E in the form of an elastomer ring L2ER has, on its elastomer inner surface, protuberances L2EA which act as stops and form chambers L2EK. The elastomer protuberances L2EA serve, together with the roll spacing of the rolls L2NW of the inner ring L2Ni of the needle bearing L2N for limiting the deflection of the bearing pin L2B relative to the first connecting rod P1. In this exemplary embodiment, a deflection of 14° or +/−7° is possible. The elastomer element L2E is fixedly connected to the connecting-rod inner surface of the first connecting rod P1 by means of a press-fit connection.

The exemplary embodiment has both an elastomer element L2E in the form of a separate part, in this case an elastomer ring L2ER, and also an elastomer layer L2ES. It would alternatively also be possible for two elastomer layers or two separate parts, for example two elastomer rings, to be used. It would also be possible for only one elastomer layer L2ES or one elastomer element L2E in the form of an elastomer ring to be used. The one elastomer layer and the one elastomer ring may in this case be arranged either within or outside the inner ring L2Ni of the needle bearing L2N, such that the rolls L2NW thereof run, during operation, either on one of these or on a connecting-rod inner surface of the first connecting rod P1 (not shown).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

0 Air supply, intake
0.1 Filter element, air filter
1 Compressed-air supply
2 Compressed-air connection
3 Ventilation connection
3.1 Ventilation filter, filter element, silencer
100 Air dryer arrangement
101 Drying container
200 Pneumatic main line
201 First part of the pneumatic main line
202 Second part of the pneumatic main line
230 Branch line, ventilation line
240 Further ventilation line
241 Further branch connection
242 Port section
250 Pneumatic control line
251 Line section
252 Control connection
260 Further ventilation line
261 Branch connection
270 Air supply line
300 Valve arrangement, solenoid-type valve arrangement
310 Directional valve arrangement
311 Check valve
312 Ventilation valve
313 Pressure-limiting means
314 Piston

314.1 Relay ventilation body
314.2 Relay unblocking body
315 Adjustable spring
320 Control valve
321 Electrical control line
322 Coil
331 First throttle
332 Second throttle
400 Air compressor in the form of a two-stage piston compressor
401 First (low-pressure) compressor stage
402 Second (high-pressure) compressor stage
410 First cylinder
411,421 Cylinder displacement chamber
420 Second cylinder
430 Crankshaft
431 Drive shaft coupling
432 Crankshaft journal
440 Housing
441 Further housing components
500 Motor
501 Drive shaft
M Drive motor
502 Bearing
600 Further pneumatic line
601, 602, 603, 604 Spring branch line
605 Accumulator branch line
610 Gallery
1000 Compressed-air feed system
1001 Compressed-air feed installation
1002 Pneumatic installation
1011, 1012, 1013, 1014 Bellows
1110 Valve block
1015 Accumulator
1111 to 1114 Solenoid-type accumulator directional valve
1115 Solenoid-type directional valve
A Axis
D Detail
DL Compressed-air flow
E Eccentric axis, shaft axis
HS Stroke position
K1, K2 Piston
K11 Piston holder
K22 Head end
L1 First connecting-rod bearing, ring ball bearing, joint plain bearing
L2 Second connecting-rod bearing
L2B Bearing pin
L2BO Bearing pin surface
L2E Elastomer element
L2EA Elastomer protuberance
L2E1, L2E2 Elastomer bushings
L2EF Elastomer element guide
L2EK Elastomer element chamber
L2ER Elastomer ring
L2G Plain bearing
L2N Needle bearing
L2Ni, L2Na Inner ring, outer ring of the needle bearing
L2ES Elastomer layer
L2ER, L2ER1-4 Elastomer rings
L2ERS Elastomer ring segment
L2NW Roller or needle of the needle bearing
MT Metal support
MTi, MTa Inner, outer metal sleeve
MV Metal press-fit connection element
P1, P2 First, second connecting rod
V Volume between elastomer rings
VS Compression position
Z Cylinder axis
Z1, Z2 Cylinder running surface

The invention claimed is:

1. A reciprocating-piston machine, having:
   at least one first cylinder and at least one first piston assigned to the first cylinder;
   at least one second cylinder and at least one second piston assigned to the second cylinder, wherein, during operation, the first piston and the second piston are deflected in a respective cylinder displacement chamber of the respective first cylinder and the second cylinder,
   a crankshaft which, during operation, can be driven and which has an eccentric crankshaft journal and a drive shaft coupling designed for the coupling of a drive shaft of a drive motor for driving the crankshaft,
   a first connecting rod configured to deflect the first piston,
   a second connecting rod configured to deflect the second piston, and
   a bearing pin about which the first and second connecting rod are rotationally movable,
   wherein the first connecting rod is mounted by at least one first connecting-rod bearing directly on the crankshaft journal and is movable by the eccentric crankshaft journal, and the second connecting rod is movable by the bearing pin, and
   wherein, between the bearing pin and at least one of the connecting rods, there is arranged at least one second connecting-rod bearing and at least one elastomer element that serves for the elastically dampened and/or resilient mounting of the at least one second connecting-rod bearing.

2. The reciprocating-piston machine as claimed in claim 1, wherein the eccentric crankshaft journal and/or the drive shaft coupling are/is aligned parallel to a shaft axis running perpendicular to a cylinder axis.

3. The reciprocating-piston machine as claimed in claim 1, wherein
   the second connecting rod is mounted by the second connecting-rod bearing and the bearing pin indirectly on the crankshaft journal, and/or
   the piston is integrally formed on, fixedly connected to, or held by means of a piston holder of the piston on the first and/or second connecting rod.

4. The reciprocating-piston machine as claimed in claim 1, wherein the first connecting rod is movable directly by the eccentric crankshaft journal and the second connecting rod is movable indirectly by the eccentric crankshaft journal.

5. The reciprocating-piston machine as claimed in claim 1, wherein at least one of the connecting-rod bearings has a plain bearing or a rolling bearing, a ball bearing or a spherical roller bearing.

6. The reciprocating-piston machine as claimed in claim 1, wherein at least one of the connecting-rod bearings has an outer ring and/or an inner ring of a rolling bearing.

7. The reciprocating-piston machine as claimed in claim 1, wherein the elastomer element is a separate part and/or wherein the elastomer element serves for generating a damping action.

8. The reciprocating-piston machine as claimed in claim 1, wherein the elastomer element is an applied layer, wherein the elastomer element, during operation, serves as a raceway for rollers of a connecting-rod bearing and/or serves for generating a damping action.

9. The reciprocating-piston machine as claimed in claim 1, wherein the second connecting-rod bearing is a rolling bearing, and the elastomer element is an elastomer layer vulcanized onto the rolling bearing.

10. The reciprocating-piston machine as claimed in claim 1, wherein the elastomer element is of ring-shaped, bushing-shaped or sleeve-shaped form.

11. The reciprocating-piston machine as claimed in claim 1, wherein the elastomer element is plate-shaped.

12. The reciprocating-piston machine as claimed in claim 1, wherein the elastomer element is connected to or in contact with a metal support.

13. The reciprocating-piston machine as claimed in claim 1, wherein the elastomer element has at least two elastomer rings, which are arranged parallel and with a spacing to one another between the bearing pin and at least one of the connecting rods and which serve for elastically damping the at least one second connecting-rod bearing.

14. The reciprocating-piston machine as claimed in claim 1, wherein at least one elastomer element is arranged between an inner and an outer metal support, and the inner metal support is connected to the second connecting-rod bearing and the outer metal support is connected to at least one of the connecting rods.

15. The reciprocating-piston machine as claimed in claim 1, wherein the at least one elastomer element is arranged between an inner metal support and at least one of the connecting rods, and the inner metal support is connected to the second connecting-rod bearing and the elastomer element is connected to at least one of the connecting rods.

16. The reciprocating-piston machine as claimed in claim 1, wherein the at least one elastomer element is arranged between the second connecting-rod bearing and an outer metal support, and the elastomer element is connected to the second connecting-rod bearing, and the outer metal support is connected to at least one of the connecting rods.

17. The reciprocating-piston machine as claimed in claim 1, wherein the at least one elastomer element has at least two mutually separate ring segments.

18. The reciprocating-piston machine as claimed in claim 1, wherein the at least one elastomer element has elastomer protuberances which are arranged along the elastomer element and which serve as stops for rollers of the second connecting-rod bearing.

19. The reciprocating-piston machine as claimed in claim 1, wherein the at least one elastomer element has elastomer protuberances which are arranged along the elastomer element which are configured to exert a damping action on a surface of the second connecting-rod bearing.

20. The reciprocating-piston machine as claimed in claim 1, wherein a maximum deflection angle of the deflection of the connecting rods between respective longitudinal axes of the connecting rods amounts to at most 14°.

21. The reciprocating-piston machine as claimed in claim 1, wherein
the first connecting rod is mounted by the first connecting-rod bearing directly on the crankshaft journal, and the first piston is held on the first connecting rod by means of a piston holder, and
the second connecting rod is connected by the second connecting-rod bearing and the bearing pin to the first connecting rod, and the second piston is formed integrally on the second connecting rod.

22. The reciprocating-piston machine as claimed in claim 1, wherein
the piston compressor is a two-stage compressor with a first and second compressor stage, wherein:
the first connecting rod of the second compressor stage is formed, wherein the first connecting rod is mounted by the first connecting-rod bearing directly on the crankshaft journal, and/or
the second connecting rod of the first compressor stage is formed, wherein the second connecting rod is mounted by the second connecting-rod bearing and the bearing pin directly on the first connecting rod.

23. The reciprocating-piston machine as claimed in claim 1, in which, between the bearing pin and at least one of the connecting rods, there is arranged a second connecting-rod bearing and at least one elastomer element which serves for the elastically dampened and/or resilient mounting of the second connecting-rod bearing.

24. A compressed-air feed installation for operating a pneumatic installation with a compressed-air flow, comprising:
an air dryer arrangement in a pneumatic main line which pneumatically connects a compressed-air supply from an air compressor and a compressed-air connection to the pneumatic installation, and
a valve arrangement which is pneumatically connected to the pneumatic main line and which serves for controlling the compressed-air flow, and an air dryer in the pneumatic main line, wherein
an air compressor with a reciprocating-piston machine, as claimed in claim 1 is connected to the compressed-air supply.

25. A compressed-air feed system having a pneumatic installation and having a compressed-air feed installation according to claim 24 for operating the pneumatic installation with a compressed-air flow, wherein the pneumatic main line pneumatically connects a compressed-air supply from an air compressor with a reciprocating-piston machine and a compressed-air connection to the pneumatic installation,
wherein the reciprocating piston machine comprises:
at least one first cylinder and at least one first piston assigned to the first cylinder;
at least one second cylinder and at least one second piston assigned to the second cylinder, wherein, during operation, the first piston and the second piston are deflected in a respective cylinder displacement chamber of the respective first cylinder and the second cylinder,
a crankshaft which, during operation, can be driven and which has an eccentric crankshaft journal and a drive shaft coupling designed for the coupling of a drive shaft of a drive motor for driving the crankshaft,
a first connecting rod configured to deflect the first piston,
a second connecting rod configured to deflect the second piston, and
a bearing pin about which the first and second connecting rod are rotationally movable,
wherein the first connecting rod is mounted by at least one first connecting-rod bearing directly on the crankshaft journal and is movable by the eccentric crankshaft journal, and the second connecting rod is movable by the bearing pin, and
wherein, between the bearing pin and at least one of the connecting rods, there is arranged at least one second connecting-rod bearing and at least one elastomer element that serves for the elastically dampened and/or resilient mounting of the at least one second connecting-rod bearing.

26. A vehicle, in particular passenger motor vehicle, having a pneumatic installation and having a compressed-air feed installation as claimed in claim 24 for operating the pneumatic installation with a compressed-air flow.

* * * * *